United States Patent [19]

Ohishi et al.

[11] Patent Number: 5,486,947
[45] Date of Patent: Jan. 23, 1996

[54] OPTICAL FIBER FOR OPTICAL AMPLIFIER

[75] Inventors: Yasutake Ohishi; Terutoshi Kanamori; Yoshiki Nishida; Atsushi Mori; Shoichi Sudo, all of Mito, Japan

[73] Assignee: Nippon Telegraph and Telephone Corporation, Tokyo, Japan

[21] Appl. No.: 238,936

[22] Filed: May 6, 1994

Related U.S. Application Data

[62] Division of Ser. No. 934,242, Aug. 25, 1992, Pat. No. 5,351,335.

[30] Foreign Application Priority Data

| Aug. 26, 1991 | [JP] | Japan | 3-213568 |
| Mar. 30, 1992 | [JP] | Japan | 4-74394 |
| Apr. 21, 1992 | [JP] | Japan | 4-101424 |
| Jun. 15, 1992 | [JP] | Japan | 4-155386 |
| Jun. 16, 1992 | [JP] | Japan | 4-157058 |

[51] Int. Cl.$^6$ ............................................. H01S 3/17
[52] U.S. Cl. ........................... 359/341; 359/343; 385/122; 385/142; 372/6
[58] Field of Search ................................ 359/341, 343; 385/142, 122, 123, 144; 372/6

[56] References Cited

U.S. PATENT DOCUMENTS

| 4,647,545 | 3/1987 | Lucas et al. | 501/30 |
| 4,857,293 | 8/1989 | Pastor et al. | 423/489 |
| 4,863,237 | 9/1989 | France | 385/141 |
| 4,962,995 | 10/1990 | Andrews et al. | 385/123 |

FOREIGN PATENT DOCUMENTS

| 0282155 | 9/1988 | European Pat. Off. . |
| 0312084 | 4/1989 | European Pat. Off. . |

OTHER PUBLICATIONS

W. J. Miniscalco et al., "1.3 µmFluoride Fibre Laser", Electronics Letters, vol. 24, No. 1, Jan. 7, 1988, p. 28.
Y. Miyajima et al, "ND$^{3+}$ Doped Fluoro–Zirconate Fiber Amplifier Oprated around 1.3µm", Technical Digest Optical Fiber Communication Conference '90 San Francisco, (1990, PD16), pp. 1–4.
Y. Ohishi et al, "Pr$^{3+}$ Doped Fluoride Fiber Amplifier Operating at 1.31 µm", Technical Digest Optical Fiber Communication Conference '91 San Diego, (1991, PD2), pp. 242–245.
Y. Ohishi et al, "Laser Diode Pumped Pr$^{3+}$–Doped and Pr$^{3+}$–Yb$^{3+}$–Codoped Fluoride Fibre Amplifiers Operating at 1.3µm", Electronics Letters, vol. 27, No. 22, (1991), pp. 1995–1996.
Tomozawa and Doremus, *Treatise on Materials Science and Technology, Glass IV*, vol. 26, Chapter 4, Academic Press, Inc, 1985, pp. 151–253.
M. J. F. Digonnet, "Closed–Form Expressions for the Gain in Three– and Four–Level Laser Fibers", *IEEE Journal of Quantum Electronics*, vol. 26, No. 10, Oct. 1990, pp. 1788–1796.
I. D. Aggarwal et al, *Fluoride Glass Fiber Optics*, Chapter 1, Academic Press, Inc., 1991, pp. 1–35.
Y. Ohishi et al, "Pr$^{3+}$–doped Fluoride Fiber Amplifier Operating at 1.31 µm", *Optics Letters*, vol. 16, No. 22, Nov. 15, 1991, pp. 1747–1749.
Journal of Lightware Technology, vol. LT–3, No. 3, Jun., 1985, pp. 569–573, "A Core–Clad Composition For Crystallization–Free Fluoride Fibers", H. Tokiwa et al.

(List continued on next page.)

Primary Examiner—Nelson Moskowitz
Attorney, Agent, or Firm—Spencer & Frank

[57] ABSTRACT

Fluoride glass-based optical fiber for an optical amplifier which contains rare earth metal ions in the core glass has a relative refractive index difference Δn between the core and the cladding of 1.4% or more. The core glass contains $PbF_2$ in a proportion of 25 mol % or less based on the total composition of the core glass. The fluoride glass is doped with rare earth metal ions, and part of the fluorine in the glass may be substituted by at least one halogen $Pr^{3+}$, $Pr^{3+}$—$Yb^{3+}$, $Pr^{3+}$—$Nd^{3+}$, or $Pr^{3+}$—$Er^{3+}$ can be doped as the rare earth metal ions. Chlorine, bromine or iodine may be used as the halogen.

46 Claims, 14 Drawing Sheets

OTHER PUBLICATIONS

Chemical Abstracts, vol. 110, No. 12, Jun. 12, 1989, p. 314, Abstract No. 217699j, "New Fluoride Glasses For The Preparation Of Infrared Optical Fibers", J. Lucas.

Chemical Abstracts, vol. 113, No. 14, Oct. 1, 1990, p. 286, Abstract No. 119789f, "Single-Mode Optical Fibers Having Low Dispersion In Wide Wavelength Range", Y. Oishi et al.

Electronics Letters, vol. 27, No. 16, Aug., 1991, pp. 1472–1474, "Systems Characterisation Of High Gain And High Saturated Output Power, $Pr^{3+}$-Doped Fluorozirconate Fibre Amplifier At 1.3 μm", R. Lobbett et al.

Electronics Letters, vol. 27, No. 8, Apr., 1991, pp. 628–629, "Amplification At 1.3 μm In a $Pr^{3+}$-Doped Single-Mode Fluorozirconate Fibre", S. F. Carter et al.

Glass Technology, vol. 28, No. 1, Feb., 1987, "The Preparation of Fluoride Glass Single Mode Fibers", H. Poignant et al., pp. 38–42.

Chemical Abstracts, vol. 109, No. 12, Sep., 1988, Abstract No. 97721r, "Halide Glass For IR-Transmitting Optical Fibers", Kanamori, Teruhisa.

Chemical Abstracts, vol. 112, No. 24, Jun. 11th, 1990, Abstract No. 222185j, "Infrared-Trnasmitting Fluoride Glass", Sawanobori Shigeto et al.

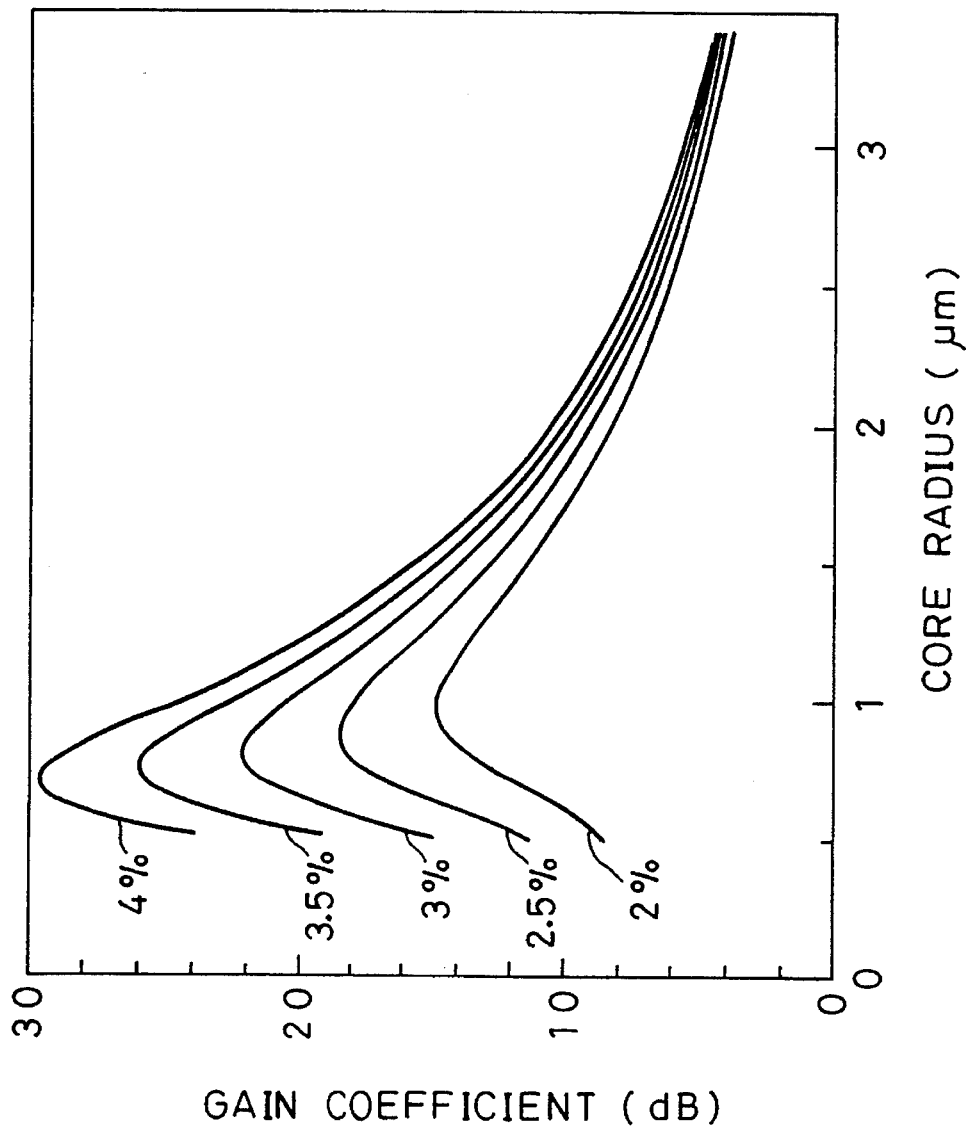

OPTICAL FIBER FOR OPTICAL AMPLIFIER

BACKGROUND OF THE INVENTION

This is a Division of application Ser. No. 07/934,242 filed Aug. 25, 1992, now U.S. Pat. No. 5,351,335.

FIELD OF THE INVENTION

The present invention relates to an optical fiber for use in a 1.3 μm band optical fiber amplifier to be used in optical communication systems, and more specifically, to a rare earth metal ion-doped fluoride-based optical fiber having a high gain coefficient for optical amplifiers.

DESCRIPTION OF THE PRIOR ART

In recent years, studies have been energetically performed on optical fiber amplifiers which involve doping of the core of an optical fiber with rare earth metal ions, especially $Er^{3+}$ ions, to induce stimulated emission as a result of transitions within the 4f shell, so that they may be applied to 1.5 μm optical communication systems. Rare earth metal ion-doped optical fiber amplifiers are high in gain and have gain characteristics not dependent on polarization of a beam. They also have a low noise index and broad-band wavelength characteristics. Therefore, their application to optical communication system is very attractive.

The 1.3 μm band, in which wavelength dispersion in a quartz-based optical fiber becomes zero, is an important wavelength band for optical communication along with the 1.5 μm band. Research into optical fiber amplifiers operating at 1.3 μm has been carried out using $Nd^{3+}$ ion doped silica-based optical fibers or fluoride optical fibers.

In both optical fibers, however, the excited state absorption of $Nd^{3+}$ ions is great at a wavelength of 1.31 μm which is used in optical communication. Therefore, no amplification has been confirmed as described, for example, in W. J. Miniscalco, L. J. Andrews, B. A. Thompson, R. S. Qiuinby, L. J. B. Vacha and M. G. Drexhage, "Electron. Lett." (vol. 24, 1988, p. 28), or Y. Miyajima, T. Komukai, Y. Sugawa and Y. Katsuyama, "Technical Digest Optical Fiber Communication Conference '90 San Francisco" (1990, PD16).

Under these circumstances, there is a keen demand for optical fiber amplifiers which have an amplifying effect at 1.31 μm. One of the candidates is an optical fiber amplifier using an optical fiber comprising a $ZrF_4$-based fluoride glass as a host material which is doped with $Pr^{3+}$ as laser-activating ions, as proposed in Y. Ohishi, T. Kanamori, T. Kitagawa, S. Takanashi, E. Snitzer and G. H. Sigel "Technical Digest Optical Fiber Communication Conference '91 San Diego" (1991, PD2). This optical fiber amplifier utilizes the stimulated emission of the $^1G_4$–$^3H_5$ transition of $Pr^{3+}$ ions, as seen from the energy level diagram of $Pr^{3+}$ ions in FIG. 1. That is, light emission at the 1.3 μm band is due to the transition from $^1G_4$ to $^3H_5$. As shown in FIG. 1, the lower level $^3H_5$ is higher than the ground state $^3H_4$, thus forming a four level system. The central wavelength of emission is 1.322 μm. The wavelength used for pumping is 1.017 μm which causes excitation from the ground level $^3H_4$ directly to the upper level $^1G_4$.

The above-mentioned optical fiber amplifier, however, is defective in that the energy difference between the $^1G_4$ level and the $^3F_4$ level is as small as about 3,000 $cm^{-1}$. In detail, the phonon energy of the $ZrF_4$-based fluoride glass as the host material is 500 $cm^{-1}$. Hence phonon relaxation from the $^1G_4$ level to the $^3F_4$ level easily occurs, and the quantum efficiency of the $^1G_4$–$^3H_5$ transition is as low as 3% in the $ZrF_4$-based fluoride glass, thus making the degree of amplification per unit pump power, i.e. gain coefficient, remain at about 0.2 dB/mW (Y. Ohishi, T. Kanamori, J. Temmyo, M. Wada, M. Yamada, M. Shimizu, K. Yoshino, H. Hanafusa, M. Horiguchi and S. Takahashi, Electronics Letters, vol. 27, no. 22, pp. 1995–1996, 1991).

Thus, a high pump power of 25 mW is required for obtaining a gain of, for example, 5 dB.

Since the output power of a laser diode has its own limitations, however, an increase in the gain coefficient of a rase earth metal ion-doped optical fiber for an optical amplifier is necessary in order to obtain a sufficiently high gain for practical use by pumping the laser diode.

One measure for realizing the high efficiency of an optical fiber amplifier is to incorporate $PbF_2$ into zirconium glass, thereby increasing the refractive index of the core. With a conventional method in which $BaF_2$ is substituted by $PbF_2$, however, the difference (ΔT) between the crystallization temperature (Tx) and the glass transition temperature (Tg) of the core glass (ΔT is generally used as an indicator of the heat stability of glass) decreases with the increase in the $PbF_2$ content. Hence, the core crystallizes upon heating during optical fiber fabrication, resulting in an increased transmission loss, thereby decreasing the effective gain. Therefore, the relative refractive index difference Δn between the core and the cladding of the fluoride optical fiber is at most 1.2%.

SUMMARY OF THE INVENTION

The object of the present invention is to solve the above-described problems and provide an optical fiber for an optical amplifier capable of operating with sufficient gain at the 1.3 μm band.

The present inventors conducted extensive studies and found that this object could be attained by (a) increasing the core-cladding relative refractive index difference Δn, thereby increasing the pump power density in the core of the optical fiber, or (b) decreasing the phonon energy of the bond between the metal and fluorine, e.g. Zr—F bond, in the fluoride glass. The present invention has been accomplished based on this discovery.

According to one aspect of the present invention, there is provided a fluoride glass optical fiber for an optical amplifier having a core and a cladding, and containing rare earth metal ions in a core glass, wherein the relative refractive index difference (Δn) between the core and the cladding is 1.4% or more, and the core glass contains $PbF_2$ in a proportion of 25 mol % or less based on the total composition of the core glass.

Here, the core glass may contain LiF in a proportion of 3 to 12 mol % and within the range (11–0.4x)< y <(15–0.4x) in which x represents the concentration of $PbF_2$ (mol %) and y represents the concentration of LiF (mol %). The core may contain a core matrix comprising a fluoride glass composed of 50 to 60 mol % of $ZrF_4$, 7 to 25 mol % of $PbF_2$, 6 to 19 mol % of $BaF_2$, 1.5 to 6 mol % of $LaF_3$, 0 to 4 mol % of at least one member selected from the group consisting of $ScF_3$, $YF_3$, $GdF_3$ and $LuF_3$, 1.5 to 5 mol % of $AlF_3$, and 3 to 12 mol % of LiF, with the total amount of the components being 100 mol %. Also, the core may contain a core matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $GaF_3$, and 2 to 10 mol % of LiF or NaF, with the total amount of the components being 100 mol %. On the other hand, the cladding may contain a cladding matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $AlF_3$ or $GaF_3$, and 2 to 10 mol % of LiF or NaF, with the total amount of the components being 100 mol %. The cladding may also contain a cladding matrix comprising a fluoride glass composed of 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of one member selected from the group consisting of LiF and NaF, with the total amount of the components being 100 mol %.

Alternatively, the core may contain a core matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %. In this case, the cladding may contain a cladding matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %. The fluoride glass constituting the cladding glass matrix may comprise 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of one member selected from the group consisting of LiF and NaF, with the total amount of the components being 100 mol %.

The rare earth metal ions may be one member selected from the group consisting of $Pr^{3+}$, $Pr^{3+}$—$Yb^{3+}$, $Pr^{3+}$—$Nd^{3+}$, and $Pr^{3+}$—$Er^{3+}$.

According to another aspect of the present invention, there is provided a fluoride glass optical fiber for an optical amplifier, having a core and a cladding and containing rare earth metal ions in a core glass, wherein part of fluoride in the fluoride glass is substituted by at least one halogen.

Here, the rare earth metal ions may be ones selected from the group consisting of $Pr^{3+}$, $Pr^{3+}$—$Yb^{3+}$, $Pr^{3+}$—$Nd^{3+}$, and $Pr^{3+}$—$Er^{3+}$. The halogen may be chlorine, bromine or iodine.

The core may have a core radius of 1.95 μm or less.

The above and other objects, effects, features and advantages of the present invention will become more apparent from the following description of embodiments thereof taken in conjunction with the accompanying drawings.

BRIEF DESCRIPTION OF THE DRAWINGS

FIG. 2B is a graph illustrating the gain characteristic of an optical fiber, plotting signal gain per pump power of 100 mW vs. core radius;

DETAILED DESCRIPTION OF THE INVENTION

Figure 1:
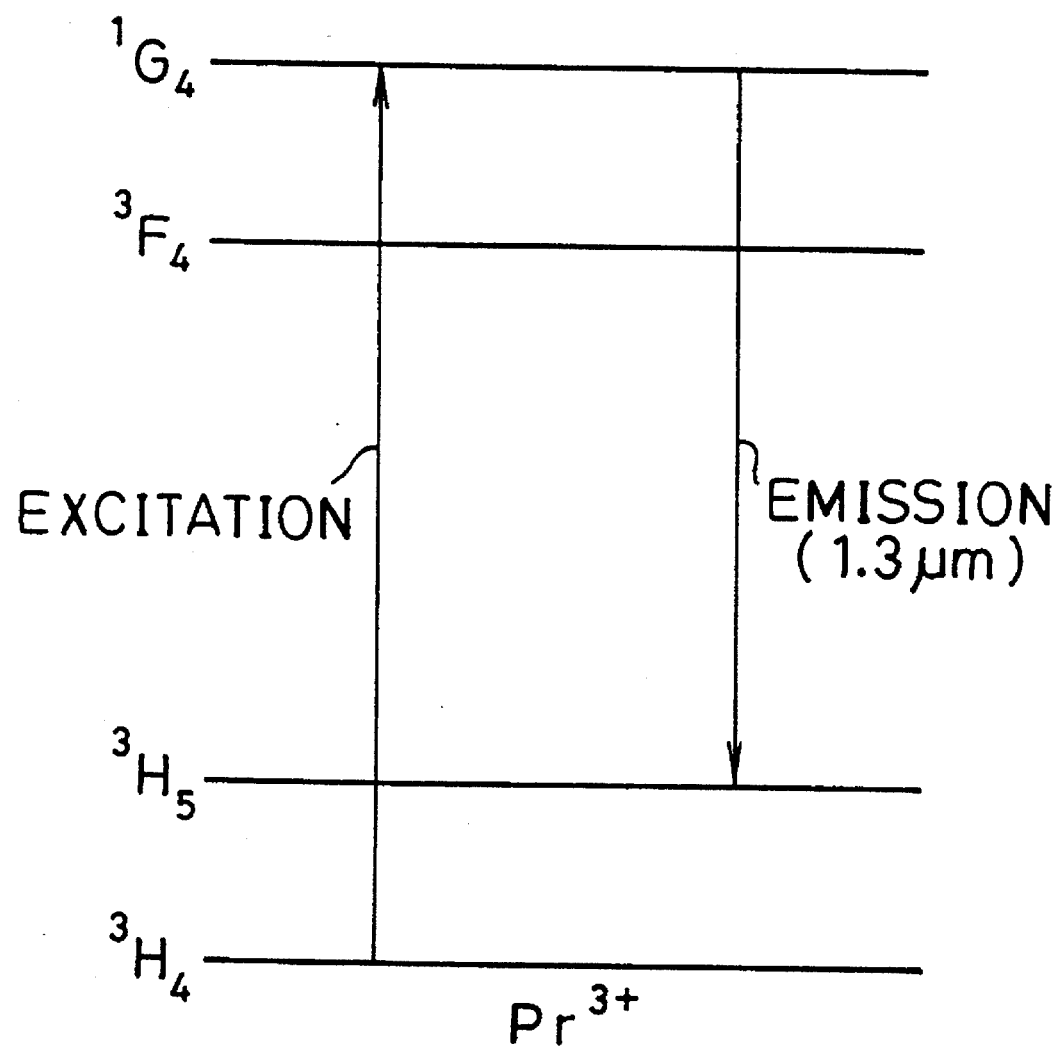
FIG. 1 is an energy level diagram illustrating energy levels of $Pr^{3+}$.

Examples of the fluoride glass constituting the optical fiber for an optical amplifier in accordance with the present invention are $ZrF_4$ glass, $InF_3$ glass, and $AlF_3$ glass (Tomozawa and Poremus, Treatise on Materials Science and Technology, volume 26, Chapter 4, Academic Press, Inc., 1985). It is also possible to use a mixed halide glass prepared by substituting part of the fluorine in the composition of the above-mentioned fluoride glasses by one or more other halogens, such as chlorine (Cl), bromine (Br) or iodine (I).

A known method for obtaining high $\Delta n$ intended to increase the power density of pump light in the core of the optical fiber is to incorporate $PbF_2$ to thereby increase the refractive index of the core. The substitution of $BaF_2$ by $PbF_2$, however, lowers the glass transition temperature and the crystallization temperature of the core glass. Therefore, the core crystallizes due to heat generated during fiber fabrication, resulting in an increased transmission loss, which causes a decrease in effective gain. In the light of these drawbacks, the present invention increases the relative refractive index difference between the core and the cladding, and incorporates a specific amount of $PbF_2$ into the core glass, thereby raising the power density of pump light in the core.

According to the present invention, $PbF_2$ (x mol %) together with LiF (y mol %) is incorporated into the core glass in an amount of 3 to 12 mol % and within the range $(11-0.4x)<y<(15-0.4x)$. Owing to this incorporation, the glass transition temperature of the core glass does not depend on the $PbF_2$ concentration, and the crystallization temperature does not decrease. Thus, the optical fiber can be made to have a high $\Delta n$ (>1.4%), using the same cladding glass. At the same time, crystallization ascribed to heating during drawing of the optical fiber is also inhibited, so that the transmission loss of the optical fiber can be minimized. Accordingly, effective gain is increased when the optical fiber is applied to an optical fiber amplifier.

According to one embodiment of the present invention, an indium-based fluoride glass having no high absorption in the infrared wavelength region is used as the core glass, whereby the fluorescence lifetime of the active ions in the host glass is prolonged compared with the use of a zirconium-based fluoride glass, and optical amplification is performed with a higher efficiency. $PbF_2$ incorporated for increasing the refractive index acts to prevent the formation of a stable glass network in the zirconium-based fluoride glass, while it works to stabilize glass as network-modifying ions along with $BaF_2$ and $SrF_2$ in the indium-based fluoride glass. Consequently, there is no decrease in $\Delta T$ according to the $PbF_2$ content. Thus, the use of a conventional zirconium type fluoride glass or an indium type fluoride glass as the cladding glass permits a high $\Delta n$ of the optical fiber, and suppresses crystallization due to heating during drawing of the optical fiber, whereby the transmission loss of the optical fiber can be minimized. If this optical fiber is applied to an optical fiber amplifier, the gain coefficient will increase.

According to another embodiment of the present invention, an indium-based fluoride glass doped with $GaF_3$ is used, aiming at an even higher efficiency in optical amplification. That is, $GaF_3$ incorporated as a modifier for achieving a stable glass network formation has an infrared absorption on the longer wavelength side than does $AlF_3$. Therefore, it is effective for prolonging the lifetime of the active ions, i.e. for increasing the efficiency of optical amplification.

According to still another embodiment of the present invention, part of the fluorine contained in the fluoride glass is substituted by at least one other halogen, thereby making it possible to improve the quantum efficiency of the $^1G_4$-$^3H_5$ transition of $Pr^{3+}$, and achieve a high efficiency in optical amplification.

A halide glass such as chloride glass, bromide glass or iodide glass is known as a glass with a smaller phonon energy than that of a fluoride glass. If one of these halide glasses is used as the host material of an optical fiber for an optical amplifier, it is expected that a $Pr^{3+}$-doped optical fiber amplifier with a high efficiency can be provided. These halide glasses, however, are highly deliquescent, and unsuitable for practical use. So-called mixed halide glasses comprising fluoride glass mixed with at least one of chloride glass, bromide glass, and iodide glass, on the other hand, are highly durable and suitable for practical use. The use of the mixed halide glass as the host material of an optical fiber doped with rare earth metal ions such as $Pr^{3+}$, therefore, can provide a highly practical $Pr^{3+}$-doped optical fiber for an optical amplifier.

In the case of $ZrF_4$ glass as the host material, for example, the phonon energy of the Zr—F bond is about 500 $cm^{-1}$. This phonon energy contributes mainly to multiphonon relaxation from $^1G_4$ to $^3F_4$.

When Cl, Br or I is doped into the $ZrF_4$ glass, the fluorine of some Zr—F bonds is substituted by Cl, Br or I. This substitution results in the formation of Zr—Cl, Zr—Br or Zr—I bonds with a lower phonon energy than the phonon energy of the Zr—F bonds. As a result, the probability of multiphonon relaxation from $^1G_4$ to $^3F_4$ lowers. This increases the quantum efficiency of the $^1G_4$-$^3F_5$ transition and also improves the gain coefficient.

The fluoride glass as the core glass that can be used for the optical fiber for an optical amplifier in accordance with the present invention includes, for example, the following:

(a) Fluoride glass with a core matrix containing 50 to 60 mol % of $ZrF_4$, 7 to 25 mol % of $PbF_2$, 6 to 19 mol % of $BaF_2$, 1.5 to 6 mol % of $LaF_3$, 0 to 4 mol % of at least one member selected from the group consisting of $ScF_3$, $YF_3$, $GdF_3$ and $LuF_3$, 1.5 to 5 mol % of $AlF_3$, and 3 to 12 mol % of LiF, with the total amount of the components being 100 mol %.

In the case of a deviation from the above range, i.e. 50 to 60 mol % of $ZrF_4$, 7 to 25 mol % of $PbF_2$, 6 to 19 mol % of $BaF_2$, 1.5 to 6 mol % of $LaF_3$, 1.5 to 5 mol % of $AlF_3$, and 3 to 12 mol % of LiF, with the total amount of these components being 100 mol %, no glass will be formed. Therefore, it is necessary that the amounts of the respective components be within the above-described range.

If at least one of $ScF_3$, $YF_3$, $GdF_3$ and $LuF_3$ is added in an amount of 4 mol % or less to the above-mentioned fundamental components so that the total amount of the components may be 100 mol %, there will be a favorable effect in that the glass is stabilized.

(b) Fluoride glass with a core matrix containing 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %.

In the case of a deviation from the above range, i.e. 10 to 40 mol % of $InF_3$, 20 to 50 mol % of $ZnF_2$, 5 to 25 mol % of $PbF_2$, 6 to 19 mol % of $BaF_2$, and 5 to 15 mol % of $SrF_2$ (the total amount: 100 mol %), no glass will be formed. Therefore, it is necessary that the amounts of the respective components be within the above-described range.

If 7 mol % or less of $CdF_2$, 10 mol % or less of $LaF_3$, 0 to 4 mol % of at least one of $ScF_3$, $YF_3$, $GdF_3$ and $LuF_3$, 5 mol % or less of $AlF_3$, 15 mol % or less of LiF or NaF are added to the above mentioned fundamental components in such amounts that the total amount of the components may be 100 mol %, there will be a favorable effect in that the glass is stabilized.

In this case, if these additional components are incorporated in amounts exceeding the above-mentioned amounts, the system will become microcrystalline and no glass will be formed. It is necessary, therefore, that the amounts of these additional components be within the above range.

(c) Fluoride glass with a core matrix containing 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $GaF_3$, and 2 to 10 mol % of LiF or NaF, with the total amount of the components being 100 mol %.

In the case of a deviation from the above range, i.e. 10 to 40 mol % of $InF_3$, 20 to 50 mol % of $ZnF_2$, 6 to 30 mol % of $BaF_2$, and 5 to 15 mol % of $SrF_2$, 1.5 to 6 mol % of at least one of $LaF_3$, $ScF_3$, $YF_3$, $GdF_3$ and $LuF_3$, 1.5 to 5 mol % of $GaF_3$, and 2 to 10 mol % of LiF or NaF (the total amount: 100 mol %), no glass will be formed. Therefore, it is necessary that the amounts of the respective components be within the above-described range.

If 25 mol % or less of $PbF_2$ or 7 mol % or less of $CdF_2$ are added to the above-mentioned fundamental components in such amounts that the total amount of the components may be 100 mol %, there will be a favorable effect in that the glass is stabilized.

In this case, if these additional components are incorporated in amounts exceeding the above-mentioned amounts, the system will become microcrystalline and no glass will be formed. It is necessary, therefore, that the amounts of these additional components be within the above range.

The matrix composition of the cladding glass that can be used for the optical fiber for an optical amplifier in accordance with the present invention includes, for example, the following:

(d) Fluoride glass containing 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %.

(e) Fluoride glass containing 43 to 55 mol % of at least one member selected from the group consisting of $ZrF_4$ and $HfF_4$, 18 to 28 mol % of $BaF_2$, 0 to 10 mol % of $PbF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of at least one member selected from the group consisting of LiF and NaF, with the total amount of the components being 100 mol %.

(f) Fluoride glass containing 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of at least one member selected from the group consisting of LiF and NaF, with the total amount of the components being 100 mol %.

(g) Fluoride glass containing 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $AlF_3$ or $GaF_3$ and 2 to 10 mol % of LiF or NaF, with the total amount of the components being 100 mol %.

A combination of the core (b) and the cladding (d) or (f), and a combination of the core (c) and the cladding (f) or (g) are preferred. In the case of the optical fiber having the combination of the core (b) and the cladding (f), the use of a zirconium-based fluoride glass for the cladding will enable the glass transition temperature and the crystallization temperature to be comparable to those of the core to be achieved with the cladding, and also permit Δn to become great.

The rare earth metal ions to be doped into the core of the optical fiber for an optical amplifier in accordance with the invention may be one member selected from the group consisting of $Pr^{3+}$, $Pr^{3+}$—$Yb^{3+}$, $Pr^{3+}$—$Nd^{3+}$, and $Pr^{3+}$—$Er^{3+}$. Typically, $Pr^{3+}$ is used, but its codoping with other ions will be effective for optical amplification, because it will result in the stimulated emission due to transition within the 4f shell as in the case of $Pr^{3+}$. The doping of rare earth metal active ions such as Pr, Yb, Nd or Er makes it possible to achieve optical amplification at various wavelengths, thus permitting high-performance optical communication systems.

The diameter of the optical fiber is generally 2 μm or less, preferable 1.95 μm or less.

EXAMPLES

Working examples of the present invention will be described in detail with reference to the appended drawings, but the invention is in no way restricted to the Examples.

EXAMPLE 1

Figure 2A:
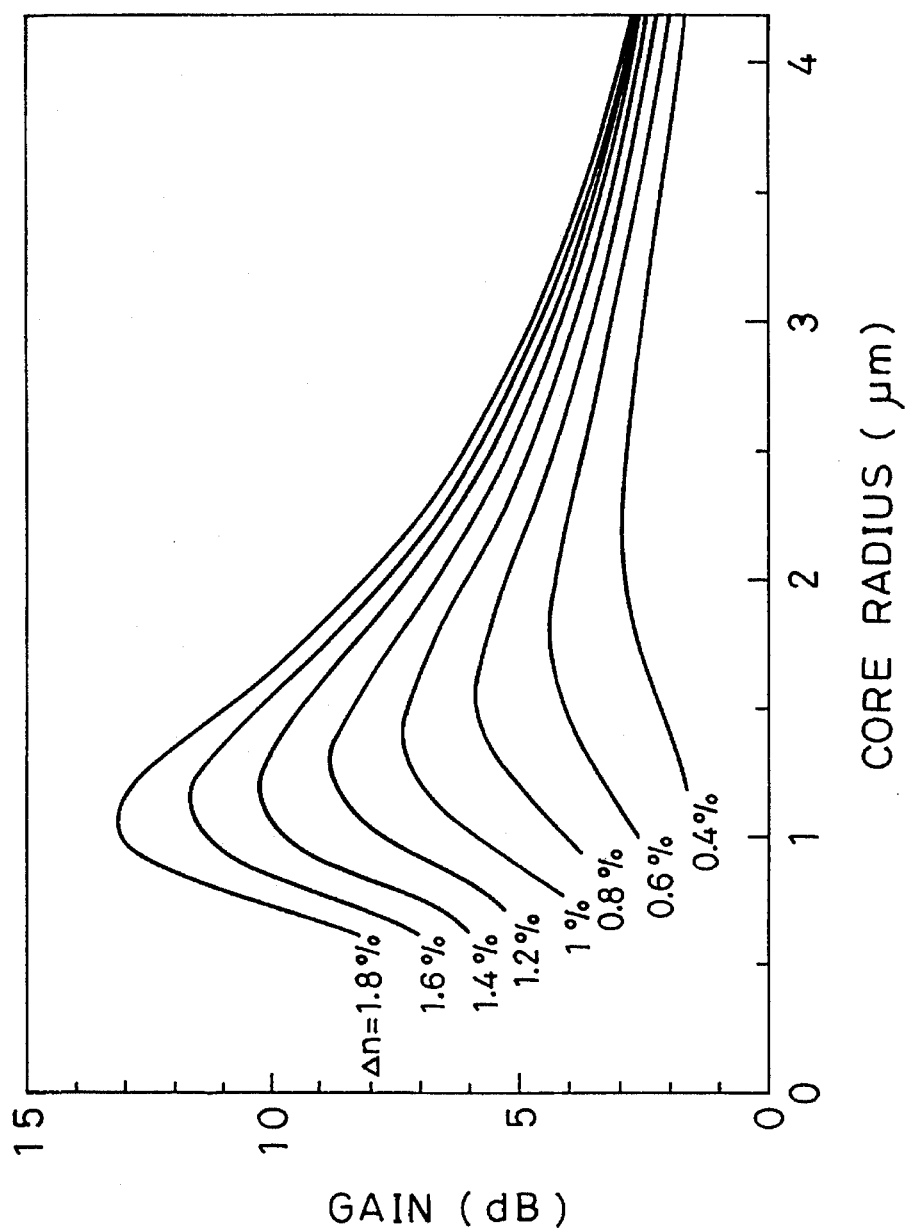
FIG. 2A is a graph illustrating the gain characteristic of an optical fiber, plotting signal gain per pump power of 100 mW vs. core radius.

FIGS. 2A and 2B are each a graph illustrating an optical characteristic of an optical fiber, plotting signal gain per pump power of 100 mW vs. core radius. Signal gain (G) expressed in dB is calculated from the following equation (M. J. F. Dignonet, IEEE Journal of Quantum Electronics, vol. 6, No. 10, P. 1788, 1990):

$$G = 4.3 \frac{\sigma \tau}{h v_p} \frac{P}{A} \frac{F}{\eta_p} \qquad \text{Equation 1:}$$

where σ is the stimulated emission cross-section of the $^1G_4$–$^3H_5$ transition ($3.5 \times 10^{-22}$ cm$^2$), τ is the lifetime of the $^1G_4$ (110 μsec), h is Planck's constant, $v_p$ is the frequency of pump wavelength, P is pump power, A is the cross-sectional area of the core, and F/$\eta_p$ is a value calculated from the equation:

$$F/\eta p = \frac{a^2}{(W_s^2 + W_p^2)} \frac{1}{1 - \exp(-(a/W_p^2))} \quad \text{Equation 2:}$$

$$W_{s,p} = a(0.46 + 1.145 V_{s,p}^{-1.5} + 2.036 V_{s,p}^{-6})$$

where $V_s$ and $V_p$ are V values at signal and pump wavelengths, respectively.

As shown in FIGS. 2A and 2B, when the relative refractive index difference is 1.4% or more, gain per 100 mW is 10 dB or more. Thus, semiconductor laser pumping can achieve such a practically acceptable gain.

Figure 3:
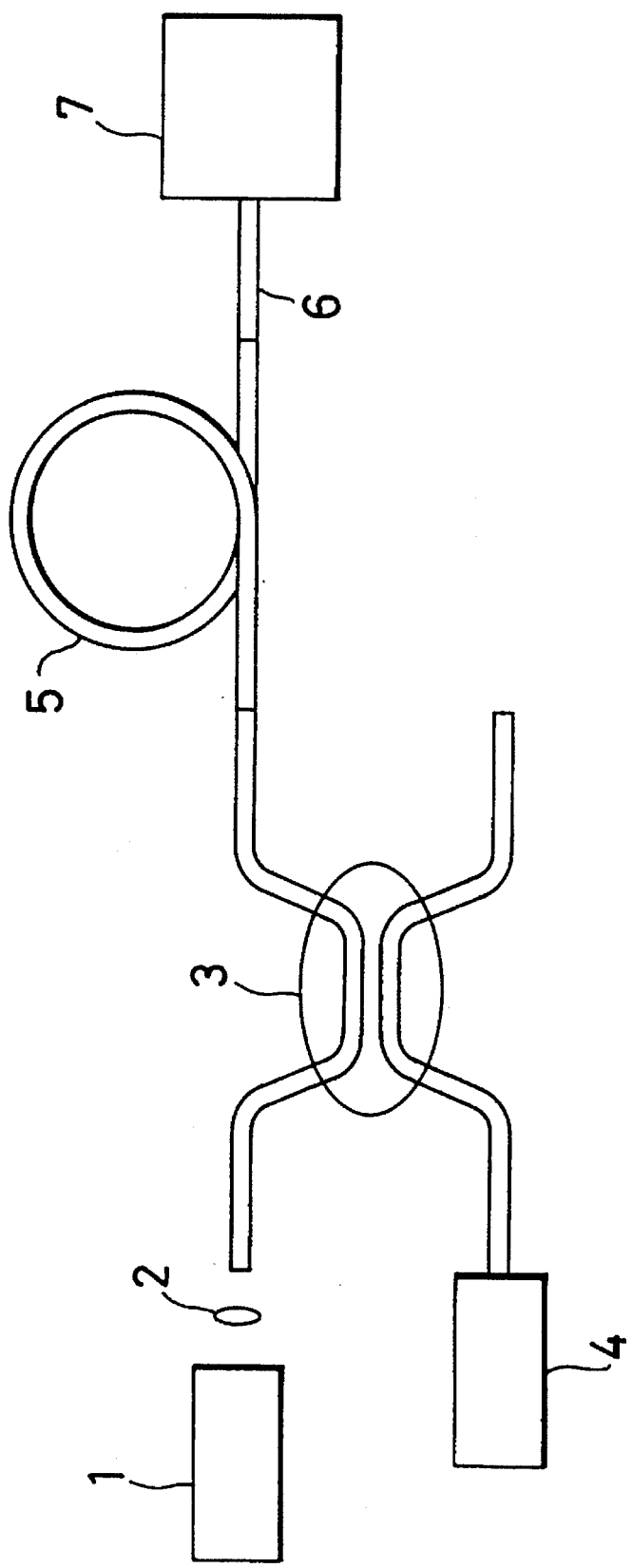
FIG. 3 is a block diagram illustrating the arrangement of an optical amplifier to which the optical fiber for an optical amplifier in accordance with an embodiment of the present invention is applicable.

FIG. 3 is a block diagram illustrating an arrangement of an optical fiber amplifier using the optical fiber of the present invention. The reference numeral 1 denotes a pump light source (a Ti-sapphire laser with a pump wavelength of 1.017 μm), 2 is a lens, 3 is a photocoupler, 4 is a single source (a distributed feedback (DFB) laser lasing at 1.31 μm), and 5 is a 500 ppm Pr$^{3+}$-doped fluoride glass optical fiber of the present invention with a core diameter of 2 μm. The optical fiber used in this Example had a relative refractive index difference of 18%, and a length of 20 m. The composition of the core glass was 49ZrF$_4$-22BaF$_2$- 3PbF$_2$-3.5LaF$_3$-2YF$_3$- 2.5AlF$_3$-18LiF (mol %), while the composition of the cladding glass was 23.7TZrF$_4$- 23.8HfF$_4$-23.5BaF$_2$-2.5LaF$_3$- 2YF$_3$-4.5AlF$_3$-20NaF (mol %).

An output from the optical fiber 5 was guided to an optical spectrum analyzer 7 via an optical fiber pigtail 6 to monitor signal light intensities when the pump light source was turned on and off. Gain, determined by the ratio of these intensities, was found to be 13 dB per pump power of 100 mW.

Figure 4:
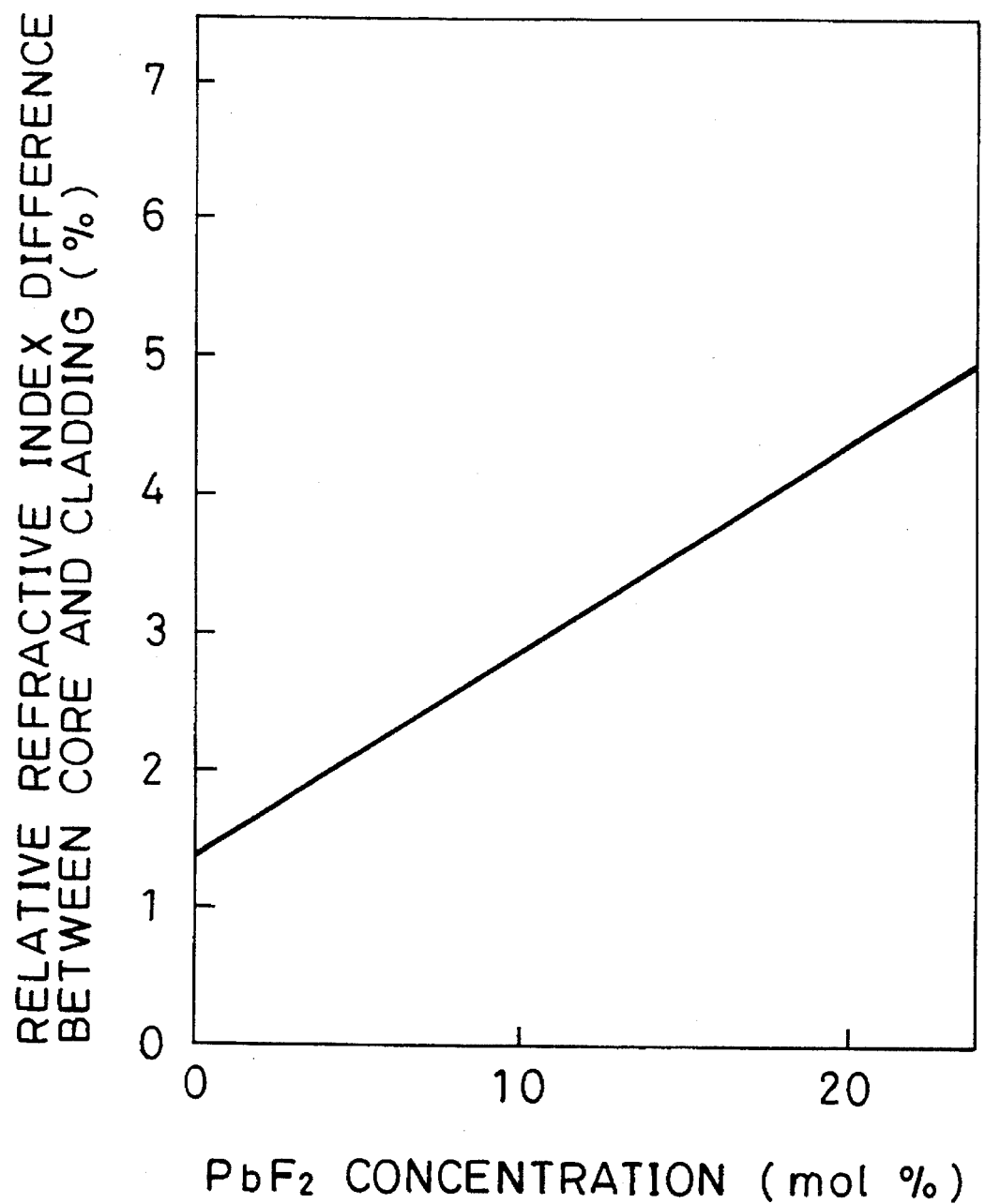
FIG. 4 is a graph illustrating changes in the relative refractive index difference with the $PbF_2$ content in the optical fiber according to Example 1 of the present invention in which the composition of the core glass is $49ZrF_4$-$(25-x)BaF_2$-$xPbF_2$-$3.5LaF_3$-$2YF_3$-$18LiF$ (mol %), and the composition of the cladding glass is $23.7ZrF_4$-$23.8HfF_4$-$23.5BaF_2$-$2.5LaF_3$-$2YF_3$-$4.5AlF_3$-$4.5NaF$ (mol %)

FIG. 4 is a graph illustrating changes in the relative refractive index difference between the core and the cladding in the optical fiber of this Example when the composition of the core glass was 49ZrF$_4$-(25-x)BaF$_2$-xPbF$_2$- 3.5LaF$_3$-2YF$_3$-18LiF (0≦x≦25), with the composition of the cladding glass being the same as described above. By using this core-cladding combination, the relative refractive index difference can be varied from 1.36% to up to 4.95%. Therefore, the use of these core and cladding glasses makes it possible to set the relative refractive index difference at 1.4% or more and to prepare a Pr$^{3+}$-doped optical fiber amplifier with a gain of 10 dB or more per pump power of 100 mW.

Table 1 below shows examples of the core radius of the optical fiber which gives a gain of 10 dB or more per pump power of 100 mW when the relative refractive index difference is 1.4% or more.

TABLE 1

| Relative Refractive Index Difference | Core Radius (r) (μm) |
| --- | --- |
| 1.4 | 1.02 ≦ r ≦ 1.3 |
| 1.6 | 0.72 ≦ r ≦ 1.5 |
| 1.8 | 0.71 ≦ r ≦ 1.63 |
| 2.0 | 1.62 ≦ r ≦ 1.7 |
| 2.5 | 0.48 ≦ r ≦ 1.84 |
| 3.0 | 0.38 ≦ r ≦ 1.95 |

ZrF$_4$ glass was used in this Example, but other fluoride glasses such as InF$_3$ glass, or AlF$_3$ glass (Tomozawa and Poremus, Treatise on Materials Science and Technology, volume 26, Chapter 4, Academic Press, Inc., 1985) may be used.

EXAMPLE 2

The amplification characteristics of an optical amplifier with the arrangement shown in FIG. 3 were measured using a 500 ppm Pr$^{3+}$-1,000 ppm Yb$^{3+}$-codoped fluoride optical fiber with a core diameter of 2 μm, a relative refractive index difference of 1.8% and a length of 5 m as an optical fiber for amplification. Pump wavelength was 980 nm. As a result, a gain of 13 dB per pump power of 100 mW was obtained.

With a Pr$^{3+}$—Yb$^{3+}$-codoped optical fiber as shown in this example, Yb$^{3+}$ is excited with pump light at 980 nm, and Pr$^{3+}$ is excited upon energy transfer from the excited Yb$^{3+}$ to Pr$^{3+}$. Since a high-output laser diode operating at the 980 nm band is present, the use of the optical fiber of this Example enables a laser diode-pumped optical amplifier to be constructed, thus facilitating its application to optical communication systems.

EXAMPLE 3

Figure 5:
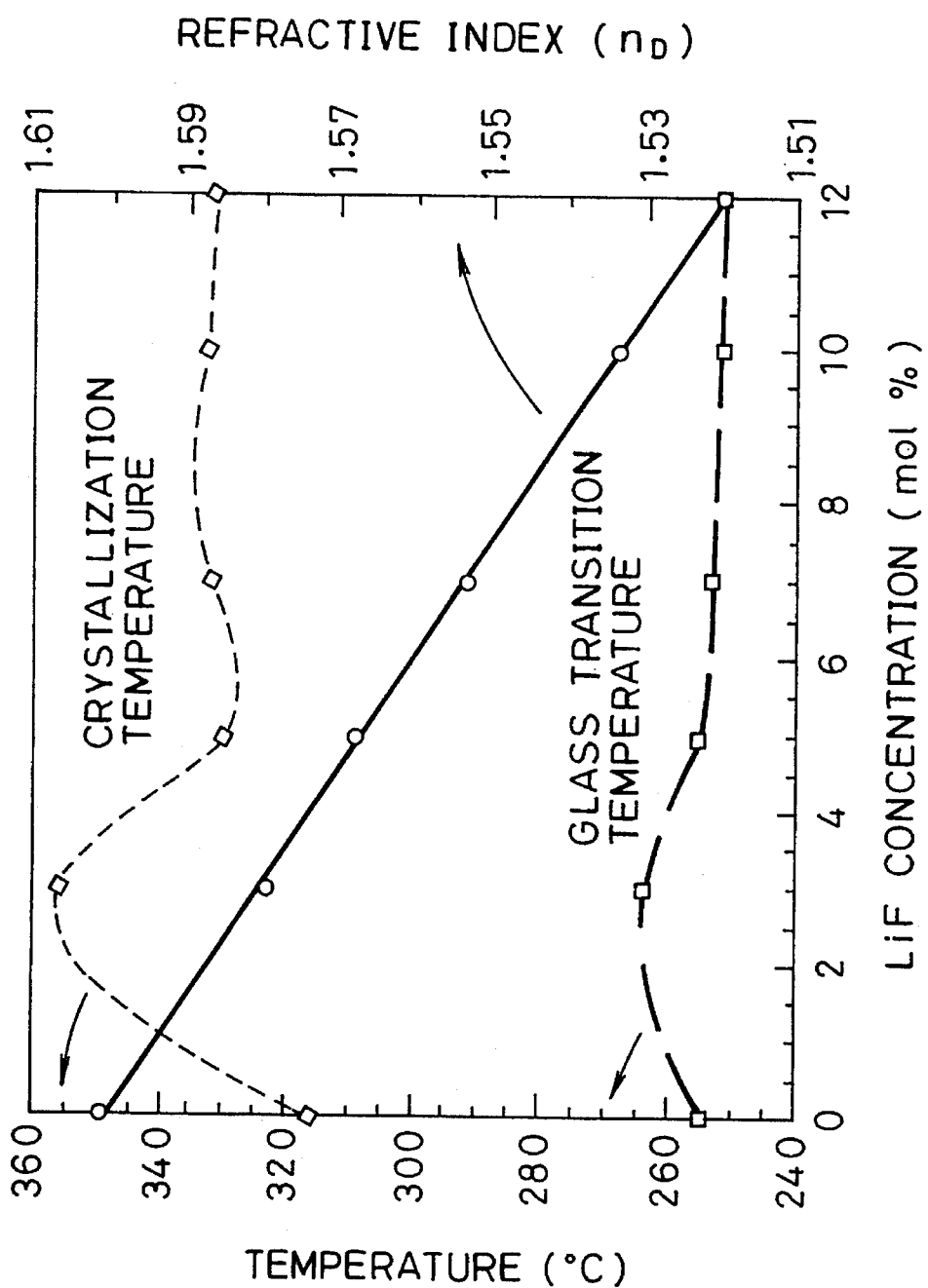
FIG. 5 is a graph illustrating changes in the glass transition temperature, crystallization temperature, and refractive index with the LiF concentration (y mol %) in the optical fiber according to Example 1 of the present invention in which the composition of the core glass is $(59.5-0.5y)ZrF_4$-$2yBaF_2$-$(32.5-2.5y)PbF_2$-$3.5LaF_3$-$2YF_3$-$2.5AlF_3$-$yLiF$ (mol %)

FIG. 5 is a graph illustrating changes in the glass transition temperature, crystallization temperature, and refractive index of the core glass in the optical fiber of the present invention having a core glass composition of (59.5–0.5y)ZrF$_4$-2yBaF$_2$-( 32.5–2.5y)PbF$_2$-3.5LaF$_3$-2YF$_3$- 2.5AlF$_3$-yLiF (mol %) with the LiF content being y mol %. The glass transition temperature did not depend on the LiF concentration, i.e. PbF$_2$ concentration, but was almost constant. No decrease in the crystallization temperature was noted at y>3 mol %. The refractive index $n_D$ took a value of 1.58 to 1.52 in response to the LiF concentration ranging from 3 to 12 mol %.

Figure 6:
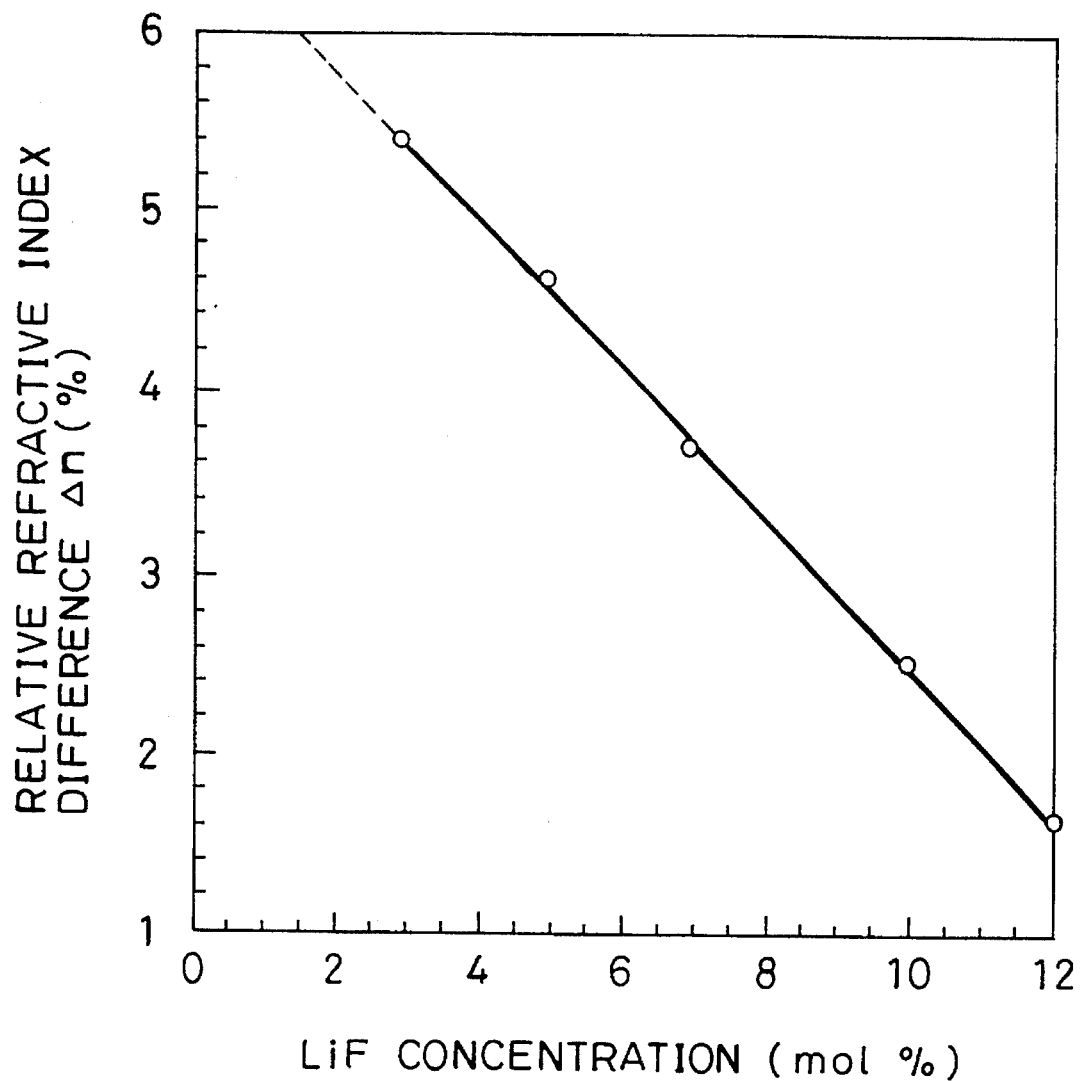
FIG. 6 is a graph illustrating the relationship between the LiF concentration and the relative refractive index difference (Δn) between the core and the cladding of the optical fiber according to Example 1 of the invention in which the composition of the cladding glass is $47.5ZrF_4$-$23.5BaF_2$-$2.5LaF_3$-$2YF_3$-$4.5AlF_3$-$20NaF$ (mol %)
Figure 7:
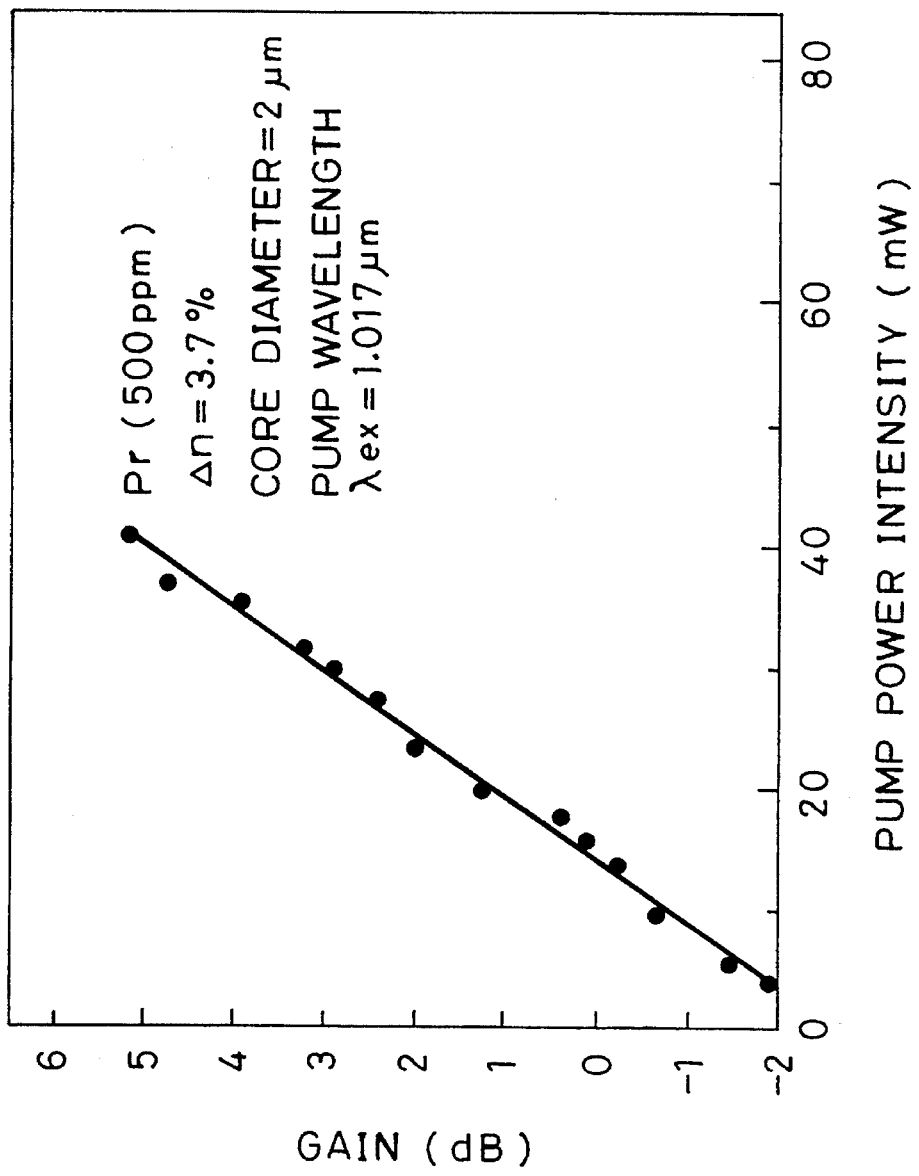
FIG. 7 is a graph illustrating the amplification characteristics of an optical fiber amplifier having the optical fiber of Example 1 of the invention in which the core is doped with 500 ppm of $Pr^{3+}$.

FIG. 6 is a graph illustrating Δn when glass with a glass transition temperature comparable to that of the core and a composition of 47.5ZrF$_4$- 23.5BaF$_2$-2.5LaF$_3$-2YF$_3$- 4.5AlF$_3$-20NaF (mol %) ($n_D$=1.4952) was used as the cladding. An optical fiber with a high Δ$_n$ of 5.4 to 1.6% relative to the LiF concentration of 3 to 12 mol % was obtained. With an optical amplifier having the same arrangement as shown in FIG. 3 and using 20 m of the optical fiber with Δ$_n$=3.7% (y=7) having a 500 ppm Pr$^{3+}$-doped core, a high gain coefficient of 0.2 dB/mW was obtained (FIG. 7). Pump wavelength was 1.017 nm. The loss of the resulting optical fiber was as low as 50 dB/km at a wavelength of 1.28 μm.

EXAMPLE 4

The glass transition temperature and crystallization temperature of glass with a core glass composition of (59.5–0.5y)ZrF$_4$-(2y-z)BaF$_2$-( 32.5–2.5y+z)PbF$_2$-3.5LaF$_3$- 2YF$_3$-2.5AlF$_3$-yLiF (mol %) containing y mol % of LiF in the optical fiber of the present invention were both within ±7° C. when the y value was the same at the LiF concentration of 3 to 12 mol % (y mol %) at –5<z<5. The transmission losses of the optical fibers fabricated using the compositions with y=7, z=–4 and y=7, z=4 for the core and the glass described in Example 1 for the cladding were both as low as 100 dB/km at a wavelength of 1.28 μm. This Example indicates that if x mol % of PbF$_2$ is incorporated, with the LiF concentration=3 to 12 mol % and (11–0.4x)<y<(15–0.4x), the glass transition temperature and crystallization temperature are almost unchanged within the fluctuation of ±7° C., and an optical fiber with a minimal transmission loss is obtained if the same cladding glass is used.

EXAMPLE 5

Optical fibers were prepared using glass with a composition of 47.5ZrF$_4$-23.5BaF$_2$-2.5LaF$_3$-2YF$_3$-4.5AlF$_3$-20NaF (mol %) for the cladding and using the core glass with compositions shown in Table 2. The resulting optical fibers had low transmission losses (50 to 200 dB/km at a wavelength of 1.28 μm) and high $\Delta_n$ (>1.4%).

EXAMPLE 6

Optical fibers were prepared in the same manner as in Example 5 except that the fluoride glass with the compositions shown in Table 3 were used as the core glass. The resulting optical fibers had low transmission losses (50 to 200 dB/km at a wavelength of 1.28 μm) and high $\Delta_n$ (>1.4%).

TABLE 2

| Component (mol %) | | | | | | | | | |
|---|---|---|---|---|---|---|---|---|---|
| $ZrF_4$ | $BaF_2$ | $PbF_2$ | $LaF_3$ | $ScF_3$ | $YF_3$ | $GdF_3$ | $LuF_3$ | $AlF_3$ | LiF |
| 60 | 6 | 23 | 6 | 0 | 0 | 0 | 0 | 2 | 3 |
| 59 | 6 | 24 | 3 | 0 | 0 | 0 | 0 | 5 | 3 |
| 58 | 6 | 25 | 3.5 | 0 | 2 | 0 | 0 | 2.5 | 3 |
| 57 | 10 | 20 | 3 | 0 | 2.5 | 0 | 0 | 2.5 | 5 |
| 56 | 9 | 20 | 3.5 | 0 | 2 | 0 | 0 | 2.5 | 7 |
| 52 | 17 | 15 | 1.5 | 0.5 | 0.5 | 0.5 | 0.5 | 2.5 | 10 |
| 52 | 15 | 15 | 1.5 | 4 | 0 | 0 | 0 | 2.5 | 10 |
| 52 | 15 | 15 | 1.5 | 0 | 0 | 4 | 0 | 2.5 | 10 |
| 52 | 15 | 15 | 1.5 | 0 | 0 | 0 | 4 | 2.5 | 10 |
| 52 | 15 | 15 | 2.5 | 2 | 1 | 0 | 0 | 2.5 | 10 |
| 52 | 15 | 15 | 2.5 | 0 | 1 | 2 | 0 | 2.5 | 10 |
| 52 | 15 | 15 | 2.5 | 0 | 1 | 0 | 2 | 2.5 | 10 |
| 52 | 15 | 15 | 1.5 | 0 | 4 | 0 | 0 | 2.5 | 10 |

TABLE 3

| Component (mol %) | | | | | | | | | |
|---|---|---|---|---|---|---|---|---|---|
| $ZrF_4$ | $BaF_2$ | $PbF_2$ | $LaF_3$ | $ScF_3$ | $YF_3$ | $GdF_3$ | $LuF_3$ | $AlF_3$ | LiF |
| 50 | 19 | 15 | 2 | 0 | 2 | 0 | 0 | 2 | 10 |
| 50 | 19 | 15 | 2 | 2 | 0 | 0 | 0 | 2 | 10 |
| 50 | 19 | 15 | 2 | 0 | 0 | 2 | 0 | 2 | 10 |
| 50 | 19 | 15 | 2 | 0 | 0 | 0 | 2 | 2 | 10 |
| 60 | 6 | 22 | 6 | 0 | 1.5 | 0 | 0 | 1.5 | 3 |
| 60 | 6 | 25 | 3 | 1.5 | 0 | 0 | 0 | 1.5 | 3 |
| 60 | 13 | 15 | 3 | 0 | 0 | 1.5 | 3 | 1.5 | 3 |
| 60 | 13 | 15 | 1.5 | 3 | 3 | 0 | 0 | 1.5 | 3 |
| 60 | 17 | 7 | 4 | 0 | 3 | 0 | 0 | 5 | 4 |
| 60 | 17 | 7 | 4 | 0 | 4 | 0 | 0 | 4 | 4 |
| 60 | 17 | 7 | 3 | 4 | 0 | 0 | 0 | 5 | 4 |
| 60 | 17 | 7 | 3 | 0 | 0 | 4 | 0 | 4 | 5 |
| 60 | 17 | 7 | 3 | 0 | 0 | 0 | 4 | 4 | 5 |
| 56 | 17 | 7 | 3 | 0 | 0 | 0 | 0 | 5 | 12 |
| 53 | 17 | 7 | 6 | 0 | 0 | 0 | 0 | 5 | 12 |

EXAMPLE 7

Figure 8:
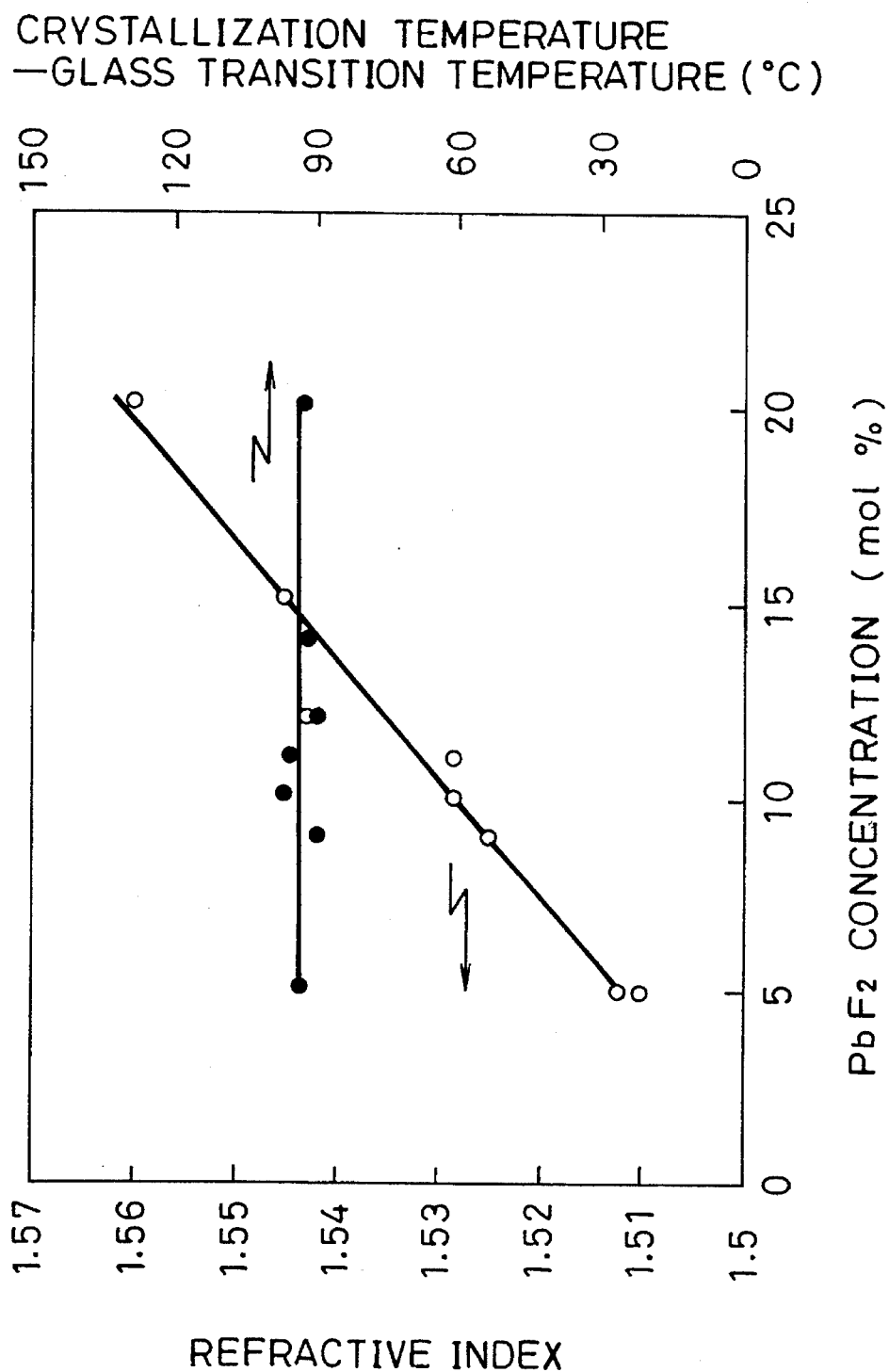
FIG. 8 is a graph illustrating changes in the difference (ΔT) between the crystallization temperature and the glass transition temperature and in refractive index with $PbF_2$ concentration (x mol %) in the optical fiber according to Example 7 of the present invention in which the composition of the core glass is $35InF_3$-$25ZnF_2$-$(25-x)BaF_2$-$10SrF_2$-$xPbF_2$-$4AlF_3$-$LaF_3$ (mol %)
Figure 9:
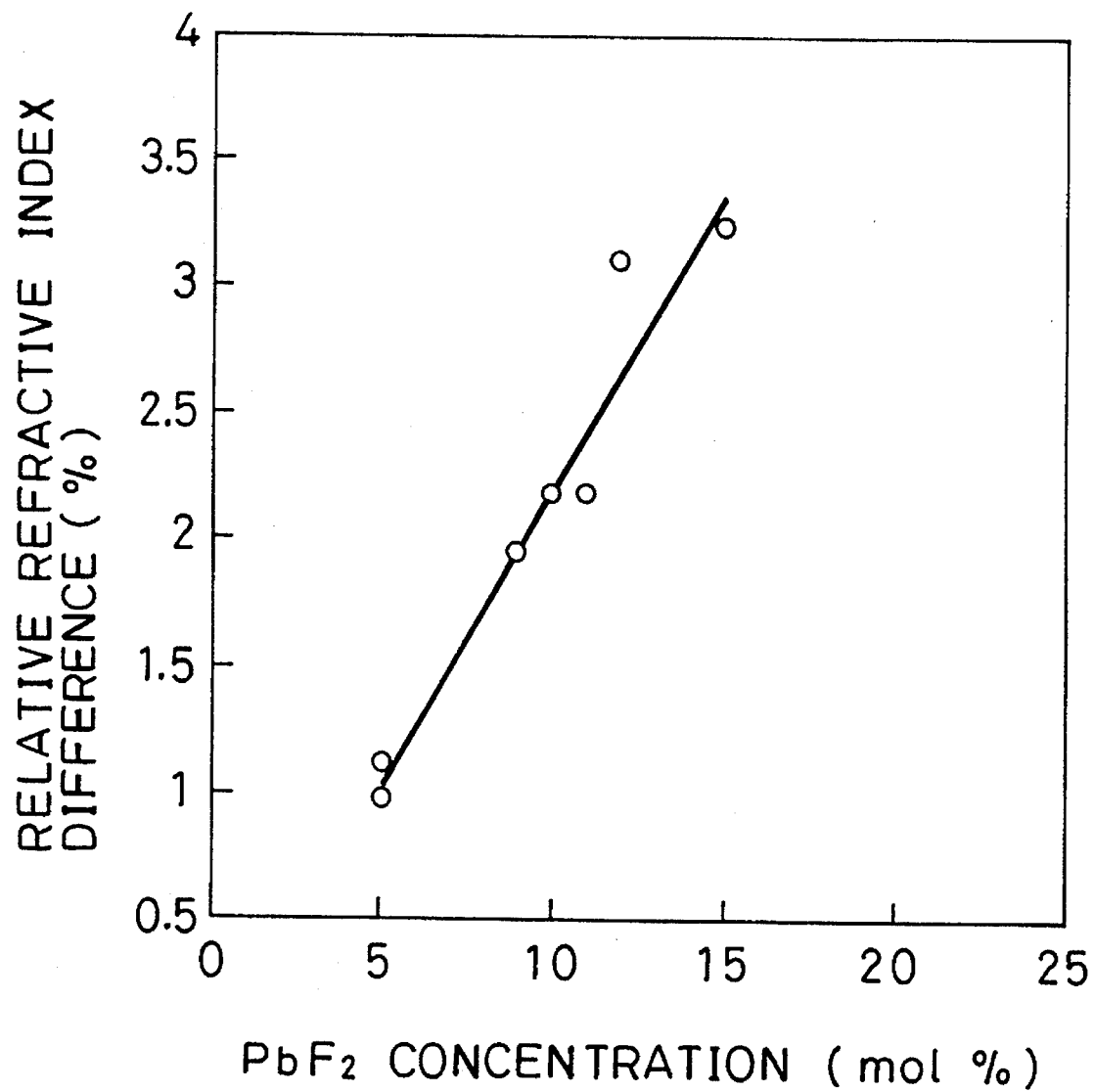
FIG. 9 is a graph illustrating the relative refractive index difference with the $PbF_2$ concentration (x mol %) in the optical fiber according to Example 7 of the present invention in which the composition of the core glass is $35InF_3$-$25ZnF_2$-$(25-x)BaF_2$-$10SrF_2$-$xPbF_2$-$4AlF_3$-$LaF_3$ (mol %), and the composition of the cladding glass is $35InF_3$-$25ZnF_2$-$15BaF_2$-$10SrF_2$-$5CdF_2$-$5AlF_3$-$5LaF_3$ ($n_D$=1.495)

FIG. 8 illustrates changes in the difference (ΔT) between the crystallization temperature (Tx) and the glass transition temperature (Tg), as well as in the refractive index, with the $PbF_2$ content (x mol %) when the core glass composition was $35InF_3$- $25ZnF_2$-$(25-x)BaF_2$-$10SrF_2$-$xPbF_2$-$4AlF_3$-$LaF_3$ (mol %) in the optical fiber of the present invention. The white circles (o) represent the refractive index, and the black circles (●) the glass transition temperature. As clear from FIG. 8, ΔT was almost constant without depending on the $PbF_2$ concentration. The refractive index ($n_D$) was 1.51 to 1.56 for the $PbF_2$ concentration of 5 to 20 mol %. Therefore, a high Δn optical fiber with Δn of 1.0 to 3.7% is obtained by using as the cladding an indium-based fluoride glass ($n_D$=1.4950 with the composition $35InF_3$-$25ZnF_2$-$15BaF_2$-$10SrF_2$-$5CdF_2$-$5AlF_3$-$5LaF_3$ and a glass transition temperature comparable to that of the core (FIG. 9). With an optical amplifier using 20 m of the optical fiber with a Δn of 3.7% (x=20) and having a core doped with 500 ppm of $Pr^{3+}$, a high gain coefficient of 0.2 dB/mW was obtained. The core diameter of the optical fiber was 2 μm, and pump wavelength was 1,017 nm. The transmission loss of the resulting optical fiber was low (100 dB/km) at a wavelength of 1.25 μm.

EXAMPLE 8

High Δn optical fiber with a Δn of 1.0 to 3.7% was obtained by using, as the cladding, a zirconium-based fluoride glass ($n_D$=1,4952) with a composition of $47.5ZrF_4$-$23.5BaF_2$-$2.5LaF_3$-$2YF_3$-$4.5AlF_3$-$20NaF$ (mol %) and a glass transition temperature comparable to that of the core glass used in Example 7. With an optical amplifier having the same arrangement as in FIG. 3 and using 20 m of the optical fiber (core diameter: 2 μm) with a Δn of 3.3% (x=15) and having a core doped with 500 ppm of Pr, a high gain coefficient of 0.2 dB/mW was obtained. Pump wavelength was 1,017 nm. The transmission loss of the resulting optical fiber was low (50 dB/km) at a wavelength of 1.25 μm.

EXAMPLE 9

With an optical amplifier having the same arrangement as in FIG. 3 and using 20 m of the optical fiber (core diameter: 2 μm) of Example 1 with a Δn of 3.7% (x=20) and having a core codoped with 3,000 ppm of Yb and 500 ppm of Pr, a gain of 10 dB at a pump power of 100 mW was obtained when a laser diode operating at 980 nm was used as a pump light source.

EXAMPLE 10

With an optical amplifier having the same arrangement as in FIG. 3 and using 20 m of the optical fiber (core diameter: 2 μm) of Example 1 with a Δn of 3.3% (x=15) and having a core codoped with 3,000 ppm of Er and 500 ppm of Pr, a gain of 10 dB at a pump power of 100 mW was obtained when a laser diode operating at 980 nm was used as a pump light source.

EXAMPLE 11

An optical fiber with a low transmission loss (50 to 200 dB/km at a wavelength of 1.3 μm) and a high Δn (>2%) was obtained when glass with a composition of $47.5ZrF_4$-$23.5BaF_2$-$2.5LaF_3$-$2YF_3$-$4.5AlF_3$-$20NaF$ (mol %) was used for the cladding and indium-based fluoride glass with one of the compositions shown in Table 4 was used as the core glass.

EXAMPLE 12

High Δn optical fiber with a Δn of 1 to 4.0% was obtained in the same manner as in Example 7, except that the composition of the core glass and that of the cladding glass in the optical fiber of the present invention were selected from those shown in Table 5. An optical amplifier was constructed in the same manner as in Example 7 using the resulting optical fiber. It gave a high gain coefficient and a low transmission loss comparable to those in Example 7.

TABLE 4

Composition of In-Fluoride Glass for Core (mol %)

| InF$_3$ | ZnF$_2$ | BaF$_2$ | SrF$_2$ | PbF$_2$ | CdF$_2$ | AlF$_3$ | LiF | NaF | LaF$_3$ | ScF$_3$ | YF$_3$ | GdF$_3$ | LuF$_3$ |
|---|---|---|---|---|---|---|---|---|---|---|---|---|---|
| 30 | 25 | 15 | 10 | 10 |   | 5 |   | 1 | 4 |   |   |   |   |
| 30 | 25 | 15 | 10 | 10 |   | 5 | 1 |   | 4 |   |   |   |   |
| 30 | 25 | 15 | 10 | 10 |   | 5 |   | 1 | 4 |   |   |   |   |
| 30 | 25 | 15 | 10 | 10 |   | 5 |   |   | 4 |   |   |   | 1 |
| 30 | 25 | 15 | 10 | 10 |   | 5 |   | 1 |   | 4 |   |   |   |
| 30 | 25 | 15 | 10 | 10 |   | 5 |   | 1 |   |   | 4 |   |   |
| 30 | 25 | 15 | 10 | 10 |   | 5 |   | 1 |   |   |   | 4 |   |
| 30 | 25 | 15 | 10 | 10 |   | 5 |   | 1 |   |   |   |   | 4 |
| 40 | 20 | 17 | 5 | 12 | 5 |   |   |   | 1 |   |   |   |   |
| 40 | 20 | 20 | 9 | 5 | 5 |   |   |   | 1 |   |   |   |   |
| 40 | 20 | 15 | 5 | 14 | 5 |   |   |   | 1 |   |   |   |   |
| 40 | 20 | 15 | 10 | 9 |   | 3 |   |   | 1 | 2 |   |   |   |
| 40 | 20 | 13 | 11 | 10 |   | 3 | 2 |   | 1 |   |   |   |   |
| 40 | 20 | 13 | 11 | 10 |   | 5 |   |   | 1 |   |   |   |   |
| 35 | 25 | 15 | 10 | 10 |   | 2 |   |   |   | 2 | 1 |   |   |
| 35 | 25 | 15 | 10 | 10 |   | 2 | 2 |   |   |   |   | 1 |   |

TABLE 5

Composition of In-Fluoride Glass for Core and Cladding (mol %)

| InF$_3$ | ZnF$_2$ | BaF$_2$ | SrF$_2$ | PbF$_2$ | CdF$_2$ | LaF$_3$ | ScF$_3$ | YF$_3$ | GdF$_3$ | LuF$_3$ | AlF$_3$ | LiF | NaF |
|---|---|---|---|---|---|---|---|---|---|---|---|---|---|
| 10 | 40 | 19 | 10 | 10 |   |   |   | 3 |   |   | 5 |   | 3 |
| 15 | 50 | 12 | 6 | 5 |   |   |   | 3 |   |   | 5 |   | 4 |
| 17 | 20 | 13 | 7 | 25 |   |   |   | 3 |   |   | 5 |   | 10 |
| 17 | 20 | 12 | 7 | 25 |   |   |   |   | 4 |   | 5 |   | 10 |
| 17 | 20 | 12 | 7 | 25 |   |   |   |   |   | 4 | 5 |   | 10 |
| 20 | 35 | 15 | 9 | 10 |   |   |   | 4 |   |   | 5 | 2 |   |
| 20 | 35 | 15 | 9 | 10 |   |   | 4 |   |   |   | 5 |   | 2 |
| 20 | 35 | 15 | 9 | 9 |   | 6 |   |   |   |   | 4 |   | 2 |
| 20 | 35 | 15 | 9 | 9 |   |   |   |   |   | 4 | 4 |   | 4 |
| 30 | 25 | 15 | 15 | 5 |   |   |   |   | 3 |   | 3 | 4 |   |
| 30 | 25 | 15 | 15 | 5 |   |   | 3 |   |   |   | 3 |   | 4 |
| 30 | 25 | 15 | 15 | 5 |   | 3 |   |   |   |   | 3 |   | 4 |
| 30 | 25 | 15 | 15 | 5 |   |   | 3 |   |   |   | 3 |   | 4 |
| 35 | 20 | 6 | 10 | 20 |   |   |   | 4 |   |   | 3 |   | 2 |
| 35 | 20 | 6 | 10 | 20 |   |   |   |   |   | 4 | 3 |   | 2 |
| 35 | 20 | 16 | 10 | 5 |   |   | 1.5 |   |   |   | 2.5 |   | 10 |
| 35 | 20 | 11 | 10 | 5 |   |   |   |   |   | 1.5 | 2.5 |   | 15 |
| 35 | 20 | 11 | 10 | 5 |   |   |   |   | 1.5 |   | 2.5 | 15 |   |
| 35 | 20 | 16 | 10 | 5 |   |   | 1.5 |   |   |   | 2.5 |   | 10 |
| 35 | 20 | 16 | 10 | 5 |   | 1.5 |   |   |   |   | 2.5 |   | 10 |
| 36.5 | 20 | 19 | 5 | 16 |   |   |   |   | 1.5 |   | 0 |   | 2 |
| 36.5 | 20 | 19 | 5 | 16 |   |   |   |   |   | 1.5 | 0 |   | 2 |
| 35 | 20 | 19 | 5 | 11 |   |   |   | 4 |   |   | 4 |   | 2 |
| 35 | 20 | 19 | 5 | 11 |   |   | 4 |   |   |   | 4 |   | 2 |
| 35 | 20 | 19 | 5 | 11 |   | 4 |   |   |   |   | 4 |   | 2 |
| 40 | 20 | 15 | 7 | 6 |   |   |   | 4 |   |   | 4 |   | 4 |
| 40 | 20 | 15 | 7 | 6 |   |   |   |   |   | 3 | 4 |   | 5 |
| 40 | 20 | 15 | 10 | 6 |   |   |   |   |   |   | 4 |   | 5 |
| 35 | 20 | 15 | 10 | 5 | 5 |   |   | 4 |   |   | 2 | 4 |   |
| 35 | 20 | 15 | 10 | 5 | 5 |   |   |   |   |   | 3 | 2 | 5 |
| 35 | 20 | 15 | 10 | 5 | 5 | 6 |   |   |   |   | 2 |   | 2 |
| 35 | 20 | 15 | 10 | 5 | 7 |   |   |   |   | 4 | 2 |   | 2 |
| 35 | 20 | 15 | 10 | 5 | 2 | 10 |   |   |   |   | 3 |   | 0 |
| 35 | 20 | 15 | 10 | 7 | 7 |   |   | 4 |   |   | 2 |   | 0 |
| 35 | 20 | 15 | 10 | 7 | 7 |   |   |   |   | 4 | 2 |   | 0 |

EXAMPLE 13

Figure 10:
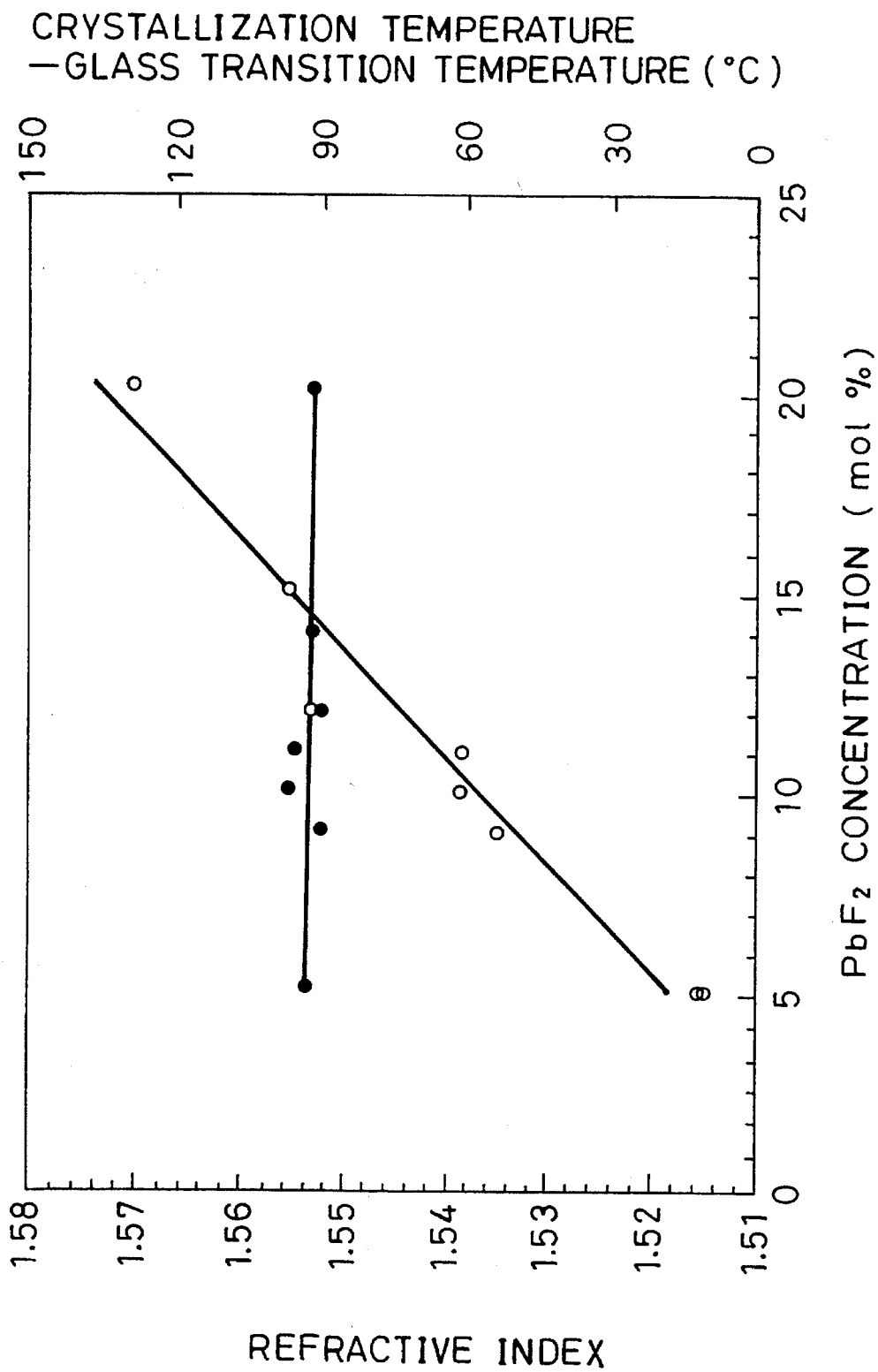
FIG. 10 is a graph illustrating changes in the difference (ΔT) between the crystallization temperature and the glass transition temperature and in the refractive index with the $PbF_2$ concentration (x mol %) in the optical fiber according to Example 12 of the present invention in which the composition of the core glass is $30InF_3$-$25ZnF_2$-$(25-x)BaF_2$-$9SrF_2$-$xPbF_2$-$4GaF_3$-$4YF_3$-$3NaF$ (mol %)

FIG. 10 illustrates the difference ($\Delta T$) between the crystallization temperature (Tx) and the glass transition temperature (Tg), as well as in the refractive index, with the PbF$_2$ content (x mol %; 5<x<20) when the core glass composition was 30InF$_3$- 25ZnF$_2$-(25-x)BaF$_2$-9SrF$_2$-xPbF$_2$-4GaF$_3$-4YF$_3$-3NaF (mol %) in the optical fiber of the present invention. The white circles (o) represent the refractive index, and the black circles (●) the difference ($\Delta T$) between the crystallization temperature and the glass transition temperature. As clear from FIG. 10, $\Delta T$ was almost constant without depending on the PbF$_2$ concentration. The refractive index ($n_D$) was 1.515 to 1.57 with respect to the PbF$_2$ concentration of 5 to 20 mol %. Therefore, a high $\Delta n$ optical fiber with a $\Delta n$ of 1.3 to 4.7% is obtained by using as the cladding an indium-based fluoride glass ($n_D$=1.495) with a composition of 30InF$_3$-25ZnF$_2$- 17BaF$_2$-11SrF$_2$-

Figure 11:
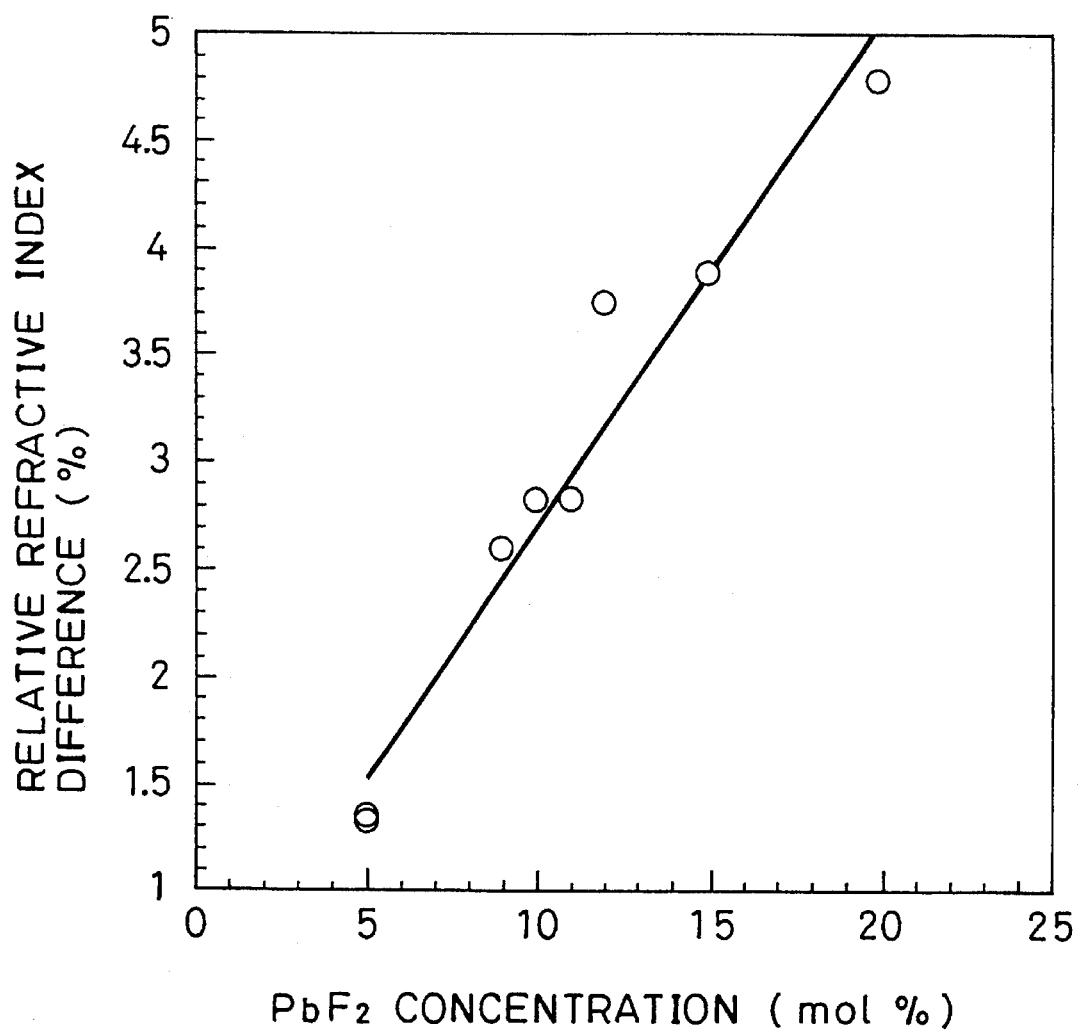
FIG. 11 is a graph illustrating the relative refractive index difference with the $PbF_2$ concentration (x mol %) in the optical fiber according to Example 12 of the invention in which the composition of the core glass is $30InF_3$-$25ZnF_2$-$(25-x)BaF_2$-$9SrF_2$-$xPbF_2$-$4GaF_3$-$4YF_3$-$3NaF$ (mol %), and the composition of the cladding glass is $30InF_3$-$25ZnF_2$-$17BaF_2$-$11SrF_2$-$5CdF_2$-$4AlF_3$-$4YF_3$-$4NaF$ ($n_D$=1.495)

5CdF$_2$-4AlF$_3$-4YF$_3$-4NaF and a glass transition temperature comparable to that of the core (FIG. 11). With an optical amplifier having the same arrangement as in FIG. 3 and using 20 m of the optical fiber with a Δn of 3.7% (x=15) and having a core doped with 500 ppm of Pr, a high gain coefficient of 0.2 dB/mW was obtained. The core diameter of the optical fiber was 2 μm, and pump wavelength ($\lambda_{ex}$) was 1,017 nm. The transmission loss of the resulting optical fiber was low (100 dB/km) at a wavelength of 1.25 μm.

EXAMPLE 14

Figure 12:
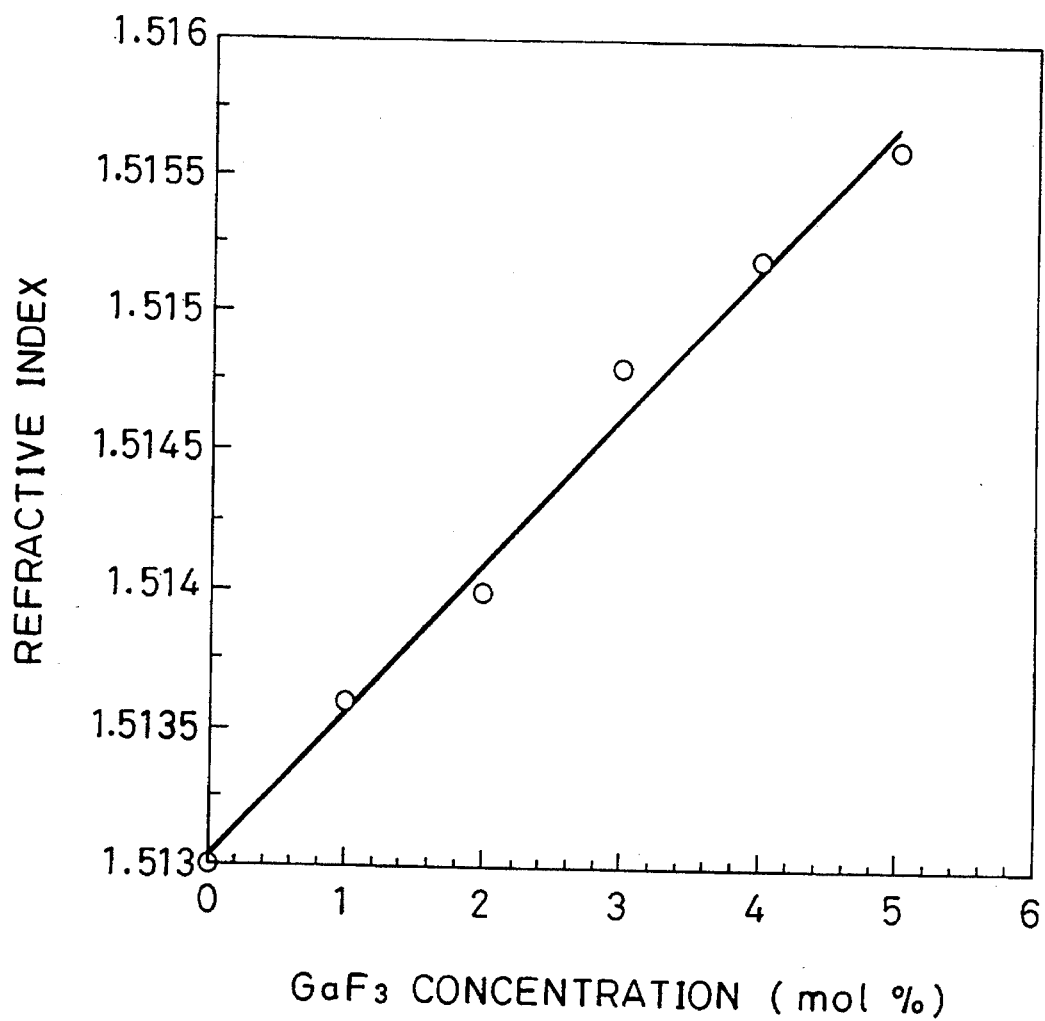
FIG. 12 is a graph illustrating changes in the refractive index with the $GaF_3$ content in the optical fiber according to Example 12 of the invention in which the composition of the core glass is $30InF_3$-$25ZnF_2$-$15BaF_2$-$9SrF_2$-$9PbF_2$-$xGaF_3$-$(5-x)AlF_3$-$4YF_3$-$3NaF$ (mol %)

FIG. 12 is a graph illustrating changes in the refractive index with the GaF$_3$ content (x mol %; 0≦x≦5) when the core glass 30InF$_3$-25ZnF$_2$-15BaF$_2$-9SrF$_2$-9PbF$_2$-xGaF$_3$-(5-x)AlF$_3$-4YF$_3$-3NaF (mol %) in the optical fiber of the present invention. As clear from FIG. 12, the refractive index ($n_D$) was 1.513 to 1.515 with respect to the GaF$_3$ concentration of 0 to 5 mol %. Therefore, a high Δn optical fiber with a Δn of 1.1 to 1.3% is obtained by using as the cladding an indium-based fluoride glass ($n_D$=1.495) with a composition of 30InF$_3$-25ZnF$_2$-17BaF$_2$-11SrF$_2$-5CdF$_2$-4AlF$_3$-4YF$_3$-4NaF (mol %) and a glass transition temperature comparable to that of the core. The transmission loss of the resulting optical fiber was low (100 dB/km) at a wavelength of 1.25 μm. This Example indicates that a low transmission-loss optical fiber with a sufficient core-cladding relative refractive index difference and free from instability of the glass can be prepared by varying the GaF$_3$ concentration even when the PbF$_2$ concentration is constant.

EXAMPLE 15

High Δn optical fiber with a Δn of 1.3 to 4.7% was obtained by using, as the cladding, zirconium-based fluoride glass ($n_D$=1.4952) with a composition of 47.5ZrF$_4$-23.5BaF$_2$-2.5LaF$_3$-2YF$_3$-4.5AlF$_3$-20NaF (mol %) and a glass transition temperature comparable to that of the core glass used in Example 13. With an optical amplifier having the same arrangement as in FIG. 3 and using 20 m of the optical fiber (core diameter: 2 μm) with a Δn of 3.3% (x=15) and having a core doped with 500 ppm of Pr, a high gain coefficient of 0.2 dB/mW was obtained. Pump wavelength was 1,017 nm. The transmission loss of the resulting optical fiber was low (50 dB/km) at 1.25 μm.

EXAMPLE 16

With an optical amplifier having the same arrangement as in FIG. 3 and using the optical fiber (core diameter: 2 μm) of Example 13 with a Δn of 3.7% (x=20) and having a core codoped with 3,000 ppm of Yb and 500 ppm of Pr, a gain of 10 dB at a pump power of 100 mW was obtained when a laser diode operating at 980 nm was used as a pump light source.

EXAMPLE 17

With an optical amplifier having the same arrangement as in FIG. 3 and using the optical fiber (core diameter: 2 μm) of Example 13 with a an of 3.3% (x=15) and having a core codoped with 3,000 ppm of Er and 500 ppm of Pr, a gain of 10 dB at a pump power of 100 mW was obtained when a laser diode operating at 980 nm was used as a pump light source.

EXAMPLE 18

With an optical amplifier having the same arrangement as in FIG. 3 and using the optical fiber (core diameter: 2 μm) of Example 13 with a Δn of 3.3% (x=15) and having a core codoped with 3,000 ppm of Nd and 500 ppm of Pr, a gain of 10 dB at a pump power of 100 mW was obtained when a laser diode operating at 790 nm was used as a pump light source.

EXAMPLE 19

An optical fiber with a low transmission loss (50 to 200 dB/km at a wavelength of 1.3 μm) and a high Δn (>2%) was obtained when glass with a composition of 47.5ZrF$_4$ (or 47.5HfF$_4$)-23.5BaF$_2$-2.5LaF$_3$-2YF$_3$-4.5AlF$_3$-20NaF (mol %) was used for the cladding and indium-based fluoride glass with the composition shown in Table 6 was used as the core glass.

EXAMPLE 20

An optical fiber with a low transmission loss (50 to 200 dB/km at a wavelength of 1.3 μm) and a high Δn (>2%) was obtained when glass with a composition of 40InF$_3$-20ZnF$_2$-15BaF$_2$-9SrF$_2$-9PbF$_2$-xGaF$_3$-(3-x)AlF$_3$-2YF$_3$-2NaF (mol %), with the GaF$_3$ content being x mol % (0≦x≦3), was used for the core and ZrF$_4$ glass with one of the compositions shown in Table 7 was used as the cladding glass.

EXAMPLE 21

An optical fiber with a low transmission loss (50 to 200 dB/km at a wavelength of 1.3 μm) and a high Δn (>2%) was obtained when glass with a composition of 30InF$_3$-25ZnF$_2$-15BaF$_2$-9SrF$_2$-9PbF$_2$-xGaF$_3$-(5-x)AlF$_3$-4YF$_3$-3NaF (mol %), with the GaF$_3$ content being x mol % (0≦x≦5), was used for the core and ZrF$_4$—HfF$_4$ glass with one of the compositions shown in Table 8 was used as the cladding glass.

TABLE 6

| Composition of In-Fluoride Glass for Core (mol %) | | | | | | | | | | | | | |
| --- | --- | --- | --- | --- | --- | --- | --- | --- | --- | --- | --- | --- | --- |
| InF$_3$ | ZnF$_2$ | BaF$_2$ | SrF$_2$ | PbF$_2$ | CdF$_2$ | GaF$_3$ | LiF | NaF | LaF$_3$ | ScF$_3$ | YF$_3$ | GdF$_3$ | LuF$_3$ |
| 30 | 25 | 15 | 9 | 9 | | 4 | | 4 | 4 | | | | |
| 30 | 25 | 15 | 9 | 9 | | 4 | 4 | | 4 | | | | |
| 30 | 25 | 16 | 9 | 9 | | 4 | | 4 | 4 | | | | |
| 30 | 25 | 15 | 9 | 9 | | 4 | | 4 | 2 | | 2 | | |
| 30 | 25 | 15 | 9 | 9 | | 4 | | 4 | | 4 | | | |
| 30 | 25 | 15 | 9 | 9 | | 4 | | 4 | | | 4 | | |
| 30 | 25 | 15 | 9 | 9 | | 4 | | 4 | | | | 4 | |
| 30 | 25 | 15 | 9 | 9 | | 4 | | 4 | | | | | 4 |

TABLE 6-continued

Composition of In-Fluoride Glass for Core (mol %)

| InF$_3$ | ZnF$_2$ | BaF$_2$ | SrF$_2$ | PbF$_2$ | CdF$_2$ | GaF$_3$ | LiF | NaF | LaF$_3$ | ScF$_3$ | YF$_3$ | GdF$_3$ | LuF$_3$ |
|---|---|---|---|---|---|---|---|---|---|---|---|---|---|
| 35 | 25 | 15 | 9 | 6 | 3 | 1.5 | | 4 | 1.5 | | | | |
| 35 | 25 | 15 | 9 | 6 | 3 | 1.5 | | 4 | | 1.5 | | | |
| 35 | 25 | 15 | 9 | 6 | 3 | 1.5 | | 4 | | | 1.5 | | |
| 40 | 20 | 15 | 9 | 9 | | 3 | | 2 | | | 2 | | |
| 40 | 20 | 13 | 11 | 9 | | 3 | 2 | | | | 2 | | |
| 35 | 25 | 15 | 10 | 9 | | 2 | | 2 | | | 2 | | |
| 35 | 25 | 15 | 10 | 9 | | 2 | 2 | | | | | 2 | |

TABLE 7

Composition of Zr-Fluoride Glass for Core (mol %)

| ZrF$_4$ | BaF$_2$ | LaF$_3$ | ScF$_3$ | YF$_3$ | GdF$_3$ | LuF$_3$ | AlF$_3$ | NaF | LiF |
|---|---|---|---|---|---|---|---|---|---|
| 52 | 25 | 2.5 | | 2.5 | | | 5 | 13 | |
| 50 | 27 | 2.5 | | 2.5 | | | 5 | 13 | |
| 55 | 22 | 2.5 | | 2.5 | | | 5 | 13 | |
| 60 | 17 | 2.5 | | 2.5 | | | 5 | 13 | |
| 56 | 16 | 4 | | 4 | | | 5 | 15 | |
| 53.5 | 20 | 6 | 4 | | | | 4.5 | 12 | |
| 53.5 | 20 | 6 | | 4 | | | 4.5 | 12 | |
| 53.5 | 20 | 6 | | | 4 | | 4.5 | 12 | |
| 53.5 | 20 | 6 | | | | 4 | 4.5 | 12 | |
| 55.5 | 29 | 2.5 | | 2.5 | | | 3.5 | 7 | |
| 55.5 | 29 | 4.5 | | 2.5 | | | 3.5 | 5 | |
| 55.5 | 27 | 6 | | 4 | | | 4.5 | 3 | |
| 55.5 | 29 | 2.5 | | 2.5 | | | 3.5 | | 7 |
| 55.5 | 29 | 4.5 | | 2.5 | | | 3.5 | | 5 |
| 55.5 | 27 | 6 | | 4 | | | 4.5 | | 3 |
| 51.5 | 26 | 1.5 | | 4 | | | 5 | 12 | |
| 52 | 24 | 2.5 | | | | | 4.5 | 15 | |
| 52 | 24 | 2.5 | 2 | | | | 4.5 | 15 | |
| 52 | 24 | 2.5 | | 2 | | | 4.5 | 15 | |
| 52 | 24 | 2.5 | | | 2 | | 4.5 | 15 | |
| 56.5 | 22 | 6 | 0 | | | | 4.5 | 11 | |
| 53.5 | 21 | 2.5 | 2.5 | | | | 4.5 | | 16 |
| 53.5 | 21 | 2.5 | | 2.5 | | | 4.5 | | 16 |
| 53.5 | 21 | 2.5 | | | 2.5 | | 4.5 | | 16 |
| 53.5 | 21 | 2.5 | | | | 2.5 | 4.5 | | 16 |
| 51.5 | 23 | 5 | | 4 | | | 1.5 | 15 | |
| 50 | 25 | 6 | | 2.5 | | | 4.5 | 12 | |
| 54.5 | 28 | 2.5 | | 1.5 | | | 4.5 | 9 | |
| 54.5 | 28 | 2.5 | | 1.5 | | | 4.5 | | 9 |

TABLE 8

Composition of Zr-Hf-Fluoride Glass for Core (mol %)

| ZrF$_4$ | HfF$_4$ | BaF$_2$ | LaF$_3$ | ScF$_3$ | YF$_3$ | GdF$_3$ | LuF$_3$ | AlF$_3$ | NaF | LiF |
|---|---|---|---|---|---|---|---|---|---|---|
| 47.5 | | 23.5 | 2.5 | | 2 | | | 4.5 | 20 | |
| 31.5 | 16 | 23.5 | 2.5 | 2 | | | | 4.5 | 20 | |
| 31.5 | 16 | 23.5 | 2.5 | | 2 | | | 4.5 | 20 | |
| 31.5 | 16 | 23.5 | 2.5 | | | 2 | | 4.5 | 20 | |
| 31.5 | 16 | 23.5 | 2.5 | | | | 2 | 4.5 | 20 | |
| 22.5 | 25 | 23.5 | 2.5 | | 2 | | | 4.5 | 20 | |
| 15.5 | 32 | 23.5 | 2.5 | | 2 | | | 4.5 | 20 | |
| | 47.5 | 23.5 | 2.5 | | 2 | | | 4.5 | 20 | |
| 37 | 12 | 25 | 3.5 | | 2 | | | 2.5 | 18 | |
| 21.7 | 25.8 | 23.5 | 2.5 | | 2 | | | 4.5 | 20 | |
| 23.7 | 23.8 | 23.5 | 2.5 | | 2 | | | 4.5 | 20 | |
| | 43 | 28 | 2.5 | | 4 | | | 2.5 | 20 | |
| 43 | | 28 | 2.5 | 4 | | | | 2.5 | 20 | |
| 31.5 | 11.5 | 28 | 2.5 | | | 4 | | 2.5 | 20 | |
| 43 | | 28 | 2.5 | | | | 4 | 2.5 | 20 | |
| 55 | | 18.5 | 4 | | 2 | | | 2.5 | 18 | |
| | 52.5 | 18 | 3 | | 2 | | | 4.5 | 20 | |
| | 55 | 18 | 2.5 | | 2 | | | 4.5 | 18 | |
| | 52.5 | 23.5 | 2.5 | | 2 | | | 4.5 | 15 | |
| 43 | | 26 | 3.5 | | 2 | | | 2.5 | 23 | |
| | 41.5 | 24.5 | 2.5 | | 2 | | | 4.5 | 25 | |
| 44.5 | | 22.5 | 3.5 | | 2 | | | 2.5 | 25 | |
| 48 | | 25 | 1.5 | | 1.5 | | | 5 | | 19 |
| 48 | | 25 | 1.5 | 1.5 | | | | 5 | | 19 |
| 48 | | 25 | 1.5 | | | 1.5 | | 5 | | 19 |
| 48 | | 25 | 1.5 | | | | 1.5 | 5 | | 19 |
| | 48.5 | 23.5 | 4 | | 0 | | | 5 | | 19 |
| | 46.5 | 23.5 | 6 | | 2.5 | | | 1.5 | 20 | |
| | 46.5 | 22.5 | 1.5 | | 4 | | | 4.5 | 21 | |

EXAMPLE 22

Optical fibers with a high Δn of 1.5 to 4.5% were obtained in the same manner as in Example 13 except that the composition of the core glass was selected from one of those shown in Table 9. Optical amplifiers were fabricated in the same manner as in Example 13 except for the use of the optical fibers thus obtained. The resulting optical amplifiers had high gain coefficients and low transmission losses comparable to those of the amplifier of Example 13.

EXAMPLE 23

Optical fibers with high Δn of 1 to 4.5% were obtained in the same manner as in Example 22 except that the composition of the core glass was selected from those shown in Table 10. Optical amplifiers were fabricated in the same manner as in Example 22 except for the use of the optical fibers thus obtained. The optical amplifiers had high gain coefficients and low transmission losses comparable to those of the amplifier of Example 13.

TABLE 9

Composition of In-Fluoride Glass for Core (mol %)

| $InF_3$ | $ZnF_2$ | $BaF_2$ | $SrF_2$ | $PbF_2$ | $CdF_2$ | $LaF_3$ | $ScF_3$ | $YF_3$ | $GdF_3$ | $LuF_3$ | $GaF_3$ | NaF | LiF |
|---|---|---|---|---|---|---|---|---|---|---|---|---|---|
| 10 | 40 | 20 | 10 | 10 |  |  |  | 4 |  |  | 4 |  | 2 |
| 15 | 50 | 17 | 5 | 0 |  |  |  | 6 |  |  | 5 |  | 2 |
| 17 | 20 | 10 | 7 | 25 |  |  |  | 6 |  |  | 5 |  | 10 |
| 17 | 20 | 10 | 7 | 25 |  |  |  |  |  | 6 | 6 |  | 10 |
| 17 | 20 | 10 | 7 | 25 |  |  |  |  | 6 |  | 5 |  | 10 |
| 20 | 35 | 15 | 9 | 9 |  |  |  | 6 |  |  | 4 | 2 |  |
| 20 | 35 | 15 | 9 | 9 |  |  | 6 |  |  |  | 4 |  | 2 |
| 20 | 35 | 15 | 9 | 9 |  | 6 |  |  |  |  | 4 |  | 2 |
| 20 | 35 | 15 | 9 | 9 |  |  |  |  |  | 6 | 4 |  | 2 |
| 30 | 25 | 15 | 15 | 5 |  |  |  |  | 3 |  | 3 | 4 |  |
| 30 | 25 | 15 | 15 | 5 |  |  | 3 |  |  |  | 3 |  | 4 |
| 30 | 25 | 15 | 15 | 5 |  | 3 |  |  |  |  | 3 |  | 4 |
| 30 | 25 | 15 | 15 | 5 |  |  | 3 |  |  |  | 3 |  | 4 |
| 35 | 20 | 6 | 10 | 20 |  |  |  | 4 |  |  | 3 |  | 2 |
| 35 | 20 | 6 | 10 | 20 |  |  |  |  |  | 4 | 3 |  | 2 |
| 30 | 20 | 16 | 10 | 10 |  |  |  | 1.5 |  |  | 2.5 | 10 |  |
| 30 | 20 | 16 | 10 | 10 |  |  |  |  |  | 1.5 | 2.5 | 10 |  |
| 30 | 20 | 16 | 10 | 10 |  |  |  |  | 1.5 |  | 2.5 | 10 |  |
| 30 | 20 | 16 | 10 | 10 |  |  | 1.5 |  |  |  | 2.5 | 10 |  |
| 30 | 20 | 16 | 10 | 10 |  | 1.5 |  |  |  |  | 2.5 | 10 |  |
| 30 | 20 | 30 | 5 | 10 |  |  |  |  |  | 1.5 | 1.5 |  | 2 |
| 30 | 20 | 30 | 5 | 10 |  |  |  |  | 1.5 |  | 1.5 |  | 2 |
| 30 | 20 | 25 | 5 | 10 |  |  |  | 4 |  |  | 4 |  | 2 |
| 30 | 20 | 25 | 5 | 10 |  |  | 4 |  |  |  | 4 |  | 2 |
| 30 | 20 | 25 | 5 | 10 |  | 4 |  |  |  |  | 4 |  | 2 |
| 40 | 20 | 15 | 7 | 6 |  |  |  | 6 |  |  | 4 |  | 2 |
| 40 | 20 | 15 | 7 | 6 |  |  |  |  |  | 6 | 4 |  | 2 |
| 37 | 20 | 15 | 10 | 0 | 5 |  |  | 6 |  |  | 5 | 2 |  |
| 37 | 20 | 15 | 10 | 0 | 5 |  |  |  |  | 6 | 5 |  | 2 |
| 37 | 20 | 15 | 10 | 0 | 5 | 6 |  |  |  |  | 5 |  | 2 |
| 37 | 20 | 15 | 10 | 0 | 7 |  |  |  |  | 4 | 5 |  | 2 |
| 37 | 20 | 15 | 10 | 0 | 7 | 4 |  |  |  |  | 5 |  | 2 |
| 37 | 20 | 15 | 10 | 0 | 7 |  |  | 4 |  |  | 5 |  | 2 |
| 37 | 20 | 15 | 10 | 0 | 7 |  | 4 |  |  |  | 5 |  | 2 |

TABLE 10

Composition of In-Fluoride Glass for Cladding (mol %)

| $InF_3$ | $ZnF_2$ | $BaF_2$ | $SrF_2$ | $PbF_2$ | $CdF_2$ | $LaF_3$ | $ScF_3$ | $YF_3$ | $GdF_3$ | $LuF_3$ | $AlF_3$ | $GaF_3$ | LiF | NaF |
|---|---|---|---|---|---|---|---|---|---|---|---|---|---|---|
| 10 | 40 | 20 | 10 | 10 |  |  |  | 4 |  |  |  | 4 |  | 2 |
| 10 | 40 | 20 | 15 | 5 |  |  |  | 4 |  |  |  | 4 |  | 2 |
| 15 | 50 | 17 | 5 | 0 |  |  |  | 6 |  |  |  | 5 |  | 2 |
| 17 | 20 | 10 | 7 | 25 |  |  |  | 6 |  |  |  | 5 |  | 10 |
| 17 | 20 | 10 | 7 | 25 |  |  |  |  |  | 6 |  | 5 |  | 10 |
| 17 | 20 | 10 | 7 | 25 |  |  |  |  | 6 |  |  | 5 |  | 10 |
| 20 | 35 | 15 | 9 | 9 |  |  |  | 6 |  |  |  | 4 | 2 |  |
| 20 | 35 | 15 | 9 | 9 |  |  | 6 |  |  |  |  | 4 |  | 2 |
| 20 | 35 | 15 | 9 | 9 |  | 6 |  |  |  |  |  | 4 |  | 2 |
| 20 | 35 | 15 | 9 | 9 |  |  |  |  |  | 6 |  | 4 |  | 2 |
| 30 | 25 | 15 | 15 | 5 |  |  |  |  | 3 |  |  | 3 | 4 |  |
| 30 | 25 | 18 | 15 | 0 |  |  | 3 |  |  |  |  | 3 |  | 6 |
| 30 | 25 | 18 | 15 | 0 |  | 3 |  |  |  |  |  | 3 |  | 6 |

TABLE 10-continued

| Composition of In-Fluoride Glass for Cladding (mol %) | | | | | | | | | | | | | | |
|---|---|---|---|---|---|---|---|---|---|---|---|---|---|---|
| InF$_3$ | ZnF$_2$ | BaF$_2$ | SrF$_2$ | PbF$_2$ | CdF$_2$ | LaF$_3$ | ScF$_3$ | YF$_3$ | GdF$_3$ | LuF$_3$ | AlF$_3$ | GaF$_3$ | LiF | NaF |
| 30 | 25 | 18 | 15 | 0 |  | 3 |  |  |  |  | 3 |  |  | 6 |
| 30 | 25 | 18 | 15 | 0 | 3 |  |  |  |  |  |  | 3 |  | 6 |
| 30 | 25 | 18 | 15 | 0 |  | 3 |  |  |  |  |  | 3 |  | 6 |
| 35 | 20 | 6 | 15 | 15 |  |  | 4 |  |  |  | 3 |  |  | 2 |
| 35 | 20 | 6 | 15 | 15 |  |  |  |  |  | 4 | 3 |  |  | 2 |
| 35 | 20 | 16 | 10 | 5 |  |  | 1.5 |  |  |  | 2.5 |  |  | 10 |
| 35 | 20 | 16 | 10 | 5 |  |  |  |  |  | 1.5 | 2.5 |  |  | 10 |
| 35 | 20 | 16 | 10 | 5 |  |  |  |  | 1.5 |  | 2.5 |  | 10 |  |
| 35 | 20 | 16 | 10 | 5 |  | 1.5 |  |  |  |  | 2.5 |  |  | 10 |
| 35 | 20 | 16 | 10 | 5 | 1.5 |  |  |  |  |  | 2.5 |  |  | 10 |
| 35 | 20 | 30 | 5 | 5 |  |  |  |  |  | 1.5 | 1.5 |  |  | 2 |
| 35 | 20 | 30 | 5 | 5 |  |  | 1.5 |  |  |  | 1.5 |  |  | 2 |
| 35 | 20 | 30 | 5 | 5 |  |  |  |  |  | 1.5 |  | 1.5 |  | 2 |
| 35 | 20 | 30 | 5 | 5 |  |  |  |  | 1.5 |  |  | 1.5 |  | 2 |
| 35 | 20 | 25 | 5 | 5 |  |  | 4 |  |  |  | 4 |  |  | 2 |
| 35 | 20 | 25 | 5 | 5 |  | 4 |  |  |  |  | 4 |  |  | 2 |
| 35 | 20 | 25 | 5 | 5 | 4 |  |  |  |  |  | 4 |  |  | 2 |
| 40 | 20 | 15 | 7 | 6 |  |  |  | 6 |  |  | 4 |  |  | 2 |
| 40 | 20 | 15 | 7 | 6 |  |  |  |  |  | 6 | 4 |  |  | 2 |
| 40 | 20 | 15 | 10 | 0 | 5 |  |  | 6 |  |  | 2 |  | 2 |  |
| 40 | 20 | 15 | 10 | 0 | 5 |  |  |  |  | 4 | 2 |  |  | 4 |
| 40 | 20 | 15 | 10 | 0 | 5 | 4 |  |  |  |  | 2 |  |  | 4 |
| 40 | 20 | 15 | 10 | 0 | 5 |  |  |  |  | 4 |  | 2 |  | 4 |
| 40 | 20 | 15 | 10 | 0 | 5 | 4 |  |  |  |  |  | 2 |  | 4 |
| 40 | 20 | 15 | 8 | 0 | 7 |  |  |  |  | 4 | 2 |  |  | 4 |
| 40 | 20 | 15 | 8 | 0 | 7 | 4 |  |  |  |  | 2 |  |  | 4 |
| 40 | 20 | 15 | 8 | 0 | 7 |  |  | 4 |  |  | 2 |  |  | 4 |

EXAMPLE 24

In the arrangement of the amplifier shown in FIG. 3, there was used a fluoride optical fiber with the core 5 doped with 500 ppm of $Pr^3$. It had a core diameter of 2 μm, a relative refractive index difference of 3.7%, and a length of 20 m. The composition of the core glass was $49ZrF_4$-$17BaF_2$-$8BaCl_2$-$3.5LaF_3$-$2.0YF_3$-$2.5AlF_3$-$18.0LiF$ (mol %), while the composition of the cladding glass was $49ZrF_4$-$10BaF_2$-$15BeF_2$-$3.5LaF_3$-$2.0YF_3$-$2.5AlF_3$-$18.0LiF$ (mol %).

Figure 13:
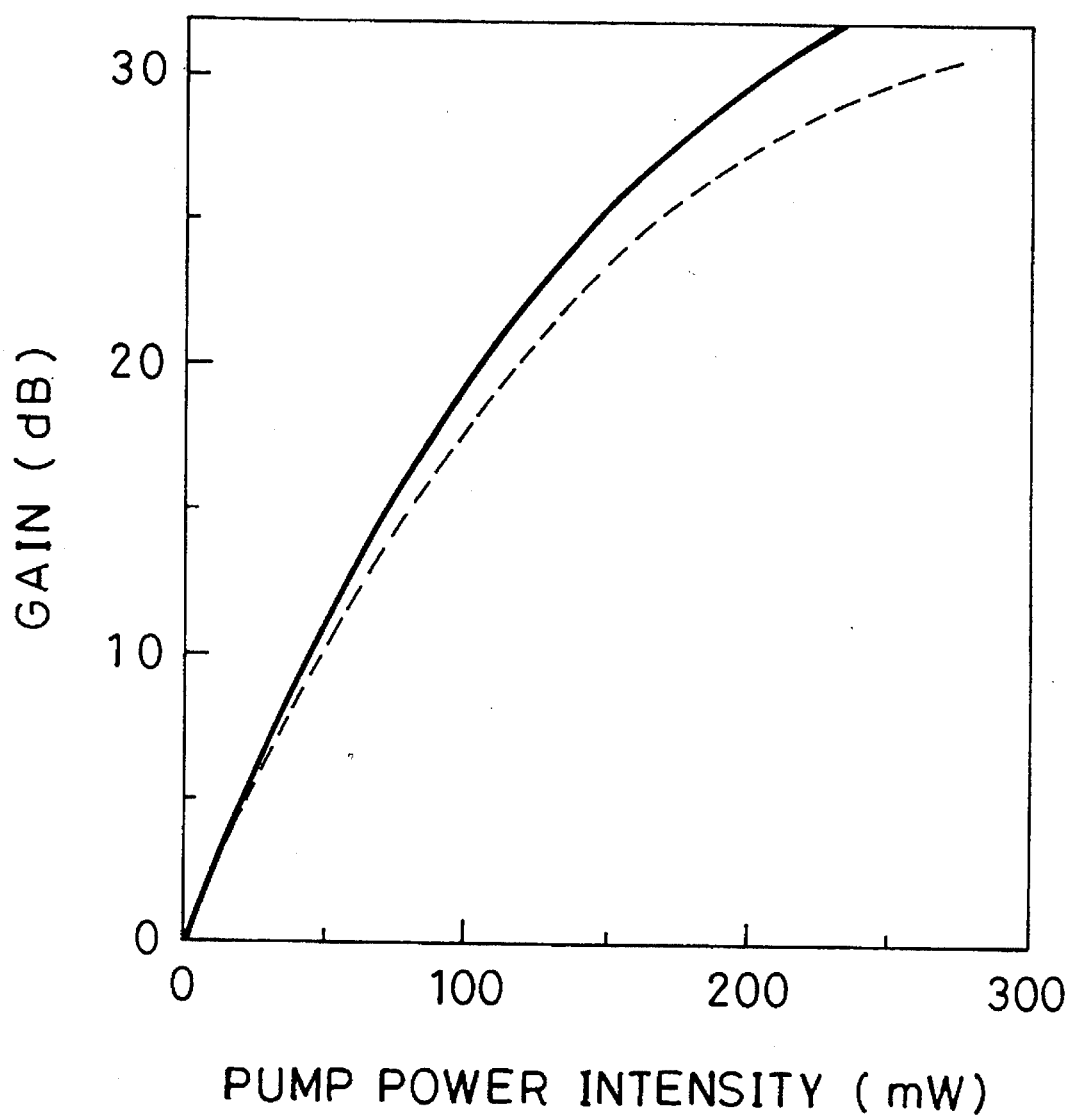
FIG. 13 is a graph illustrating dependence, on the pump power, of gain in the optical fiber amplifier of the present invention using a mixed halide glass optical fiber in which the composition of the core glass is $49ZrF_4$-$17BaF_2$-$8BaCl_2$-$3.5LaF_3$-$2.0YF_3$-$2.5AlF_3$-$18.0LiF$ (mol %), and the composition of the cladding glass is $49ZrF_4$-$10BaF_2$-$15BeF_2$-$3.5LaF_3$-$2.0YF_3$-$2.5AlF_3$-$18LiF$ (mol %), along with the characteristics of a comparison optical fiber amplifier in which the composition of the core glass is $53ZrF_4$-$16BaF_2$-$15PbF_2$-$3.5LaF_3$-$2.0YF_3$-$2.5AlF_3$-$8LiF$ (mol %), and that of the cladding glass is $47.5ZrF_4$-$23.5BaF_2$-$2.5LaF_3$-$2.0YF_3$-$4.5AlF_3$-$20NaF$ (mol %).

FIG. 13 is a graph illustrating dependence of gain on the pump power in the optical fiber for an optical amplifier obtained in this Example.

In FIG. 13, the gain indicated by the solid line is that of the optical fiber for an optical amplifier of this Example, while the gain indicated by the dotted line is that of a comparison optical fiber for an optical amplifier. The construction of the comparison optical fiber is as described below.

$Pr^{3+}$ concentration: 500 ppm

Relative refractive index difference: 3.7%

Core diameter: 2 μm

Core glass composition: $53ZrF_4$-$16BaF_2$-$15PbF_2$-$3.5LaF_3$-$2.0YF_3$-$2.5AlF_3$-$8LiF$ (mol %)

Cladding glass composition: $47.5ZrF_4$-$23.5BaF_2$-$2.5LaF_3$-$2.0YF_3$-$4.5AlF_3$-$20NaF$ (mol %)

The above-described comparison optical fiber for an optical amplifier has no chlorine incorporated in the core glass.

Although the constructional elements of the optical fiber for an optical amplifier of this Example are the same as those of the comparison optical fiber for an optical amplifier, it is understood from FIG. 13 that a higher gain is obtained in this Example than in the comparison example. The reason for this difference therebetween may be as follows: The incorporation of $BaCl_2$ into the core glass results in the substitution of part of the fluorine in the Zr F bonds by Cl. As a result, Zr—Cl bonds with a low phonon energy are formed, and the ratio of multiphonon relaxation from the $^1G_4$ level to the $^3F_4$ level of $Pr^{3+}$ is decreased. Consequently, the quantum efficiency of the transition from $^1G_4$ to $^3H_5$ is increased.

In this Example, experiments were conducted using $BaCl_2$ as a chlorine dopant. However, other chlorides such as $BaFCl$, $LaCl_3$, $PbCl_2$, $AlCl_3$, $LiCl$ or $YCl_3$ may be used as a chlorine dopant. Alternatively, the core glass may be melted in chlorine-containing gas such as $Cl_2$, HCl or $CCl_4$. When chlorine is incorporated into the core glass, the refractive index of the glass is increased. Thus, doping with chlorine is effective not only in improving the quantum efficiency of the transition from $^1G_4$ to $^3H_5$, but also in increasing the numerical apertures of the optical fiber for an optical amplifier. Doping of chlorine as well as $Pr^{3+}$ into the core glass, therefore, enables the fabrication of an efficient optical fiber amplifier.

In this Example, the rate of substitution of fluorine ions by chlorine ions was adjusted to about 5.5%, but the fabrication of an optical fiber was possible even if this rate was increased to 30%.

EXAMPLE 25

The dependence of gain on pump power at 1.31 μm was measured using an optical fiber for an optical amplifier which has the same arrangement as in FIG. 3 and which had a core glass composition of $49ZrF_4$-$17BaF_2$-$8BaBr_2$-$3.5LaF_3$-$2.0YF_3$-$2.5AlF_3$-$18LiF$ (mol %), a cladding glass composition of $49ZrF_4$-$10BaF_2$-$15BeF_2$-$3.5LaF_3$-$2.0YF_3$-$2.5AlF_3$-$18LiF$ (mol %), a $Pr^{3+}$ concentration of 500 ppm, a core diameter of 2 μm, a relative refractive index difference of 3.7%, and a length of 20 m. As in the case of Example 24, it was confirmed that the amplification characteristics were improved by substituting part of the fluorine in the core glass by another halogen (bromine in this case). The fabrication of an optical fiber was possible even when the rate of substitution of fluorine by bromine was increased to 30%.

In this Example, BaBr$_2$ was used as a bromine dopant. However, other bromides such as BaFBr, PbBr$_2$, LaBr$_3$, YBr$_3$, or LiBr may be used as a bromine dopant. Alternatively, doping with bromine ions can be performed by melting the core glass in bromine-containing gas (e.g. Br$_2$, HBr).

EXAMPLE 26

The dependence of gain on the pump power at the 1.31 μm band was measured in the same manner as in Example 24 using an optical fiber for an optical amplifier which had a core glass composition of 49ZrF$_4$-17BaF$_2$-8BaI$_2$-3.5LaF$_3$-2.0YF$_3$-2.5AlF$_3$-18.0LiF (mol %), a cladding glass composition of 49ZrF$_4$- 10BaF$_2$-15BeF$_2$-3.5LaF$_3$-2.0YF$_3$-2.5AlF$_3$-18LiF (mol %), a Pr$^{3+}$ concentration of 500 ppm, a core diameter of 2 μm, a relative refractive index difference of 3.7%, and a length of 20 m. As in the case of Example 24, it was confirmed that the amplification characteristics of the optical fiber were improved by substituting part of the fluorine in the core glass by another halogen (iodine in this case). The fabrication of an optical fiber was possible even when the rate of substitution of fluorine by iodine was increased to 30%.

In this Example, BaI$_2$ was used as an iodine dopant. However, other iodides such as PbI$_2$, BaFI, LaI$_3$, YI$_3$, or LiI may be used as iodine dopant. Alternatively, doping with iodine can be performed by melting the core glass in iodine-containing gas.

In the above-mentioned Examples 24 through 26, ZrF$_4$—BaF$_2$—LaF$_3$—YF$_3$—AlF$_3$—LiF type glass in which part of BaF$_2$, one of the components, was substituted by BeF$_2$ was used as the cladding glass. The role of this BeF$_2$ is to lower the refractive index of the glass, and this component is effective in increasing the relative refractive index difference between the core and the cladding. Moreover, BeF$_2$ may substitute ZrF$_4$, as well as BaF$_2$. The cladding glass may be a ZrF$_4$—BaF$_2$—LaF$_3$—AlF$_3$—NaF type glass which contains BeF$_2$, or ZrF$_4$—HfF$_4$—BaF$_2$—LaF$_3$—YF$_3$—AlF$_3$—LiF—NaF type glass which contains BeF$_2$. The use of these glasses can increase the relative refractive index difference to 3.7% or more. The core glass to be doped with a halogen other than fluorine may be ZrF$_4$— BaF$_2$—PbF$_2$—LaF$_3$—YF$_3$—AlF$_3$—LiF type glass (Table 11).

TABLE 11

| \multicolumn{11}{c}{Composition of Mixed-Halide Glass for Core (mol %)} |
|---|---|---|---|---|---|---|---|---|---|---|
| ZrF$_4$ | HfF$_4$ | BaF$_2$ | BeF$_2$ | LaF$_3$ | YF$_3$ | AlF$_3$ | NaF | LiF | PbF$_2$ | BaCl$_2$ |
| 49 |  | 10 | 15 | 3.5 | 2 | 2.5 |  | 18 |  |  |
| 25 |  | 10 | 24 | 3.5 | 2 | 2.5 |  | 18 |  |  |
| 31.5 | 16 | 13.5 | 10 | 2.5 | 2 | 4.5 | 20 |  |  |  |
| 51 |  | 20 | 15 | 4.5 |  | 4.5 | 20 |  |  |  |
| 53 |  | 14 |  | 3.5 | 2 | 2.5 |  | 8 | 2 | 10 |

EXAMPLE 27

The dependence of gain on the pump power at the 1.31 μm band was measured in the same manner as in Example 24 using an optical fiber which had a core glass composition of 35InF$_3$-25ZnF$_2$-5BaF$_2$-5BaCl$_2$- 10SrF$_2$-15PbF$_2$-4AlF$_3$-LiF (mol %), a cladding glass composition of 35InF$_3$-25ZnF$_2$-15BaF$_2$-10SrF$_2$-5CdF$_2$- 5AlF$_3$-5LaF$_3$ (mol %), a Pr$^{3+}$ concentration of 500 ppm, a core diameter of 2 μm, a relative refractive index difference of 3.7%, and a length of 20 m. As in the case of Example 24, it was confirmed that the amplification characteristics were improved by substituting part of the fluorine in the core glass by chlorine. While chlorine was doped in this example, it was confirmed that the amplification characteristics were improved when the core glass was doped with bromine or iodine by the use of a halide such as BaBr$_2$ or BaI$_2$.

A halide such as ZnCl$_2$, SrCl$_2$, ZnBr$_2$, SrBr$_2$, ZnI$_2$ or SrI$_2$ may be used to perform doping with chlorine, bromine or iodine.

In the above Examples, experiments were conducted using ZrF$_4$ type and InF$_3$ type fluoride optical fibers. However, it may be permissible to use as the core glass other fluoride glass such as AlF$_3$ glass (Tomozawa and Doremus, "Treatise on Materials Science and Technology," Volume 25, Chapter 4, Academic Press, Inc., 1985; or Aggarwal and Lu, "Fluoride Glass Fiber Optics," chapter 1, Academic Press, Inc., 1991) which has been doped with chlorine, bromine or iodine. Thus, the invention is in no way limited to ZrF$_4$ type or InF$_3$ type fluoride glass. Furthermore, chlorine, bromine or iodine need not be doped singly into the core, but it may be doped as a combination like chlorine-bromine or bromine-iodine. Moreover, the rate of substitution by chlorine, bromine or iodine is in no way restricted to the values described in the above Examples.

EXAMPLE 28

The dependence of gain on the pump power dependence at the 1.31 μm band was measured in the same manner as in Example 24 using an optical fiber for an optical amplifier which had a core glass composition of 23MgF$_2$-10SrCl$_2$-30SrF$_2$-13YF$_3$-23AlF$_3$- 1BeF$_2$ (mol %), a cladding glass composition of 20MgF$_2$- 50YF$_3$-20AlF$_3$-10BeF$_2$ (mol %), a Pr$^{3+}$ concentration of 500 ppm, a core diameter of 2 μm, a relative refractive index difference of 4%, and a length of 20 m. The amplification characteristics were improved more highly than when the comparison glass shown in Example 24 was used as the cladding.

In this Example, part of the fluorine was substituted by chlorine, but it was confirmed that substitution by bromine or iodine rather than chlorine was also effective, as demonstrated in other Examples. As in the case of Examples 24 to 27, MgBr$_2$, YI$_3$, YBr$_3$, etc. can be used to dope bromine or iodine.

The glass used in this Example is called AlF$_3$ glass. Typical examples of AlF$_3$ glass are as shown in Tables 12 to 14. Similar results can be obtained using these glasses.

TABLE 12

| | Sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $MgF_2$ | 20 | 55 | | | | | | 30 | 24 | 24 | | | 10 |
| $CaF_2$ | | | 60 | 30 | | | | 22 | 36 | | 40 | 10 | 15 |
| $SrF_2$ | | | | | 50 | 30 | | | | | | | 10 |
| $BaF_2$ | | | | | | | 30 | | | 35 | 10 | 20 | 10 |
| $YF_3$ | 50 | 15 | 0.5 | 21 | 5 | 30 | 10 | 15 | 14 | 14 | 10 | 4.5 | 5 |
| $AlF_3$ | 20 | 25 | 35 | 34 | 40 | 35 | 55 | 30 | 24 | 24 | 35 | 65 | 40 |
| $BeF_2$ | 10 | 5 | 4.5 | 15 | 5 | 5 | 5 | 3 | 2 | 3 | 5 | 0.5 | 5 |
| Total | 100 | 100 | 100 | 100 | 100 | 100 | 100 | 100 | 100 | 100 | 100 | 100 | 100 |

TABLE 13

| | Sample No. | | | | | |
|---|---|---|---|---|---|---|
| | 14 | 15 | 16 | 17 | 18 | 19 |
| $MgF_2$ | 23 | 24 | 28 | 23 | 23 | 19 |
| $CaF_2$ | | | | | | 20 |
| $SrF_2$ | 35 | 30 | 32 | 40 | 21 | 13 |
| $BaF_2$ | | | | | 21 | 13 |
| $YF_3$ | 15 | 20 | 10 | 13 | 10 | 11 |
| $AlF_3$ | 23 | 24 | 28 | 23 | 23 | 23 |
| $BeF_2$ | 4 | 2 | 2 | 1 | 2 | 1 |
| Total | 100 | 100 | 100 | 100 | 100 | 100 |

TABLE 14

| | Sample No. | | | | | |
|---|---|---|---|---|---|---|
| | 20 | 21 | 22 | 23 | 24 | 25 |
| $MgF_2$ | | | | | 17 | |
| $CaF_2$ | 24 | 23 | 21.5 | 20.5 | 27 | 12 |
| $SrF_2$ | | | | | | 12 |
| $BaF_2$ | 24 | 23 | 21.5 | 20.5 | 16 | 24 |
| $YF_3$ | 9.5 | 9.5 | 9 | 8.5 | 0.5 | 9 |
| $AlF_3$ | 43 | 39.5 | 38 | 35.5 | 30 | 42 |
| $BeF_2$ | 0.5 | 5 | 10 | 15 | 9.5 | 1 |
| Total | 100 | 100 | 100 | 100 | 100 | 100 |

EXAMPLE 29

In Examples 24 to 27, the rare earth metal ions doped into the core were $Pr^{3+}$ only. In the optical fibers for an optical amplifier mentioned in these Examples, however, $Pr^{3+}$(0.2 wt %)-$Yb^{3+}$(0.3 wt %), $Pr^{3+}$(0.2 wt %)-$Nd^{3+}$(2 wt %), or $Pr^{3+}$(0.2 wt %)-$Er^{3+}$(1 wt %) may be doped instead of $Pr^{3+}$. In the case of $Pr^{3+}$(0.2 wt %)-$Yb^{3+}$(0.3 wt %) and $Pr^{3+}$(0.2 wt %)-$Er^{3+}$(1 wt %), pumping is performed with light at 0.98 μm. In the case of $Pr^{3+}$(0.2 wt %)-$Nd^{3+}$(2 wt % ), pumping is performed with light at 0.8 μm. Comparison was made in terms of gain characteristics between the optical fiber with the core doped with chlorine, bromine or iodine and the optical fiber with the core not doped with halogen. It was confirmed that the optical fiber with the core doped with chlorine, bromine or iodine gave a higher gain at the 1.3 μm band at a lower pump power.

In Examples 24 to 29, chlorine, bromine or iodine was doped into the core only, but may be simultaneously doped into the cladding.

When the concentration of each of $Yb^{3+}$, $Nd^{3+}$ or $Er^{3+}$ to be codoped with $Pr^{3+}$ was within the range larger than 0 wt % and up to 3 wt %, it was confirmed that the gain characteristics could be improved by also doping at least one halogen of chlorine, bromine and iodine.

The concentration of the $Yb^{3+}$, $Nd^{3+}$ or $Er^{3+}$ is in no way restricted to the above-mentioned value. Nor are the rare earth metal ions restricted to $Pr^{3+}$, $Yb^{3+}$, $Nd^{3+}$ or $Er^{3+}$, but the quantum efficiency can be improved by effecting the above-described substitution in the presence of the transition of other rare earth metal ions.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber amplifier comprising:

a pump light source;

a light focusing means for focusing the pump light from said pump light source;

a signal source for generating a signal light;

a photocoupling means which couples the pump light with the signal light to give a coupled light; and an optical fiber having a core and a cladding, said optical fiber receiving the coupled light from said photocoupling means and amplifying the coupled light, wherein said optical fiber is a fluoride glass optical fiber containing rare earth metal ions in a core glass, a relative refractive index difference between the core and the cladding being at least 1.4%, and wherein said core glass contains $PbF_2$ in a proportion which is not greater than 25 mol % based on the total composition of said core glass.

2. The optical fiber amplifier as claimed in claim 1, wherein said relative refractive index difference between the core and the cladding is at least 2.5%.

3. An optical fiber amplifier comprising:

a pump light source;

a light focusing means for focusing the pump light from said pump light source;

a signal light source which generates a signal light;

a photocoupling means which couples the pump light with the signal light to give a coupled light; and an optical fiber having a core and a cladding, said optical fiber receiving the coupled light from said photocoupling means and amplifying the coupled light, wherein said optical fiber is a fluoride glass optical fiber containing rare earth metal ions in a core glass, and wherein part of the fluoride in said fluoride glass is substituted by at least one halogen other than fluoride.

4. The optical fiber amplifier as claimed in claim 3, wherein said fluoride glass is a $ZrF_4$ glass.

5. The optical fiber amplifier as claimed in claim 3, wherein said $ZrF_4$ glass contains Ba halide, the halide in said Ba halide being chloride, bromide or iodide.

6. The optical fiber amplifier as claimed in claim 3, wherein said fluoride glass is an $InF_3$ glass.

7. The optical fiber amplifier as claimed in claim 3, wherein said core has a core radius which is not greater than 1.95 μm.

8. A method of amplifying a laser beam comprising the steps of:

coupling a pump light with a signal light to form a coupled light; and transmitting said coupled light through an optical fiber, wherein said optical fiber has a core and a cladding, and is a fluoride glass optical fiber containing rare earth metal ions in a core glass, a relative refractive index difference between the core and the cladding being at least 1.4%, and wherein said core glass contains $PbF_2$ in a proportion which is not greater than 25 mol % based on the total composition of said core glass.

9. The method as claimed in claim 8, wherein said relative refractive index difference between the core and the cladding is at least 2.5%.

10. A method of amplifying a laser beam comprising the steps of:

coupling a pump light with a signal light to form a coupled light; and transmitting said coupled light through an optical fiber, wherein said optical fiber is a fluoride glass optical fiber containing rare earth metal ions in a core glass, and wherein part of the fluoride in said fluoride glass is substituted by at least one halogen other than fluoride.

11. The method as claimed in claim 10, wherein said fluoride glass is a $ZrF_4$ glass.

12. The method as claimed in claim 11, wherein said $ZrF_4$ glass contains Ba halide, the halide in said Ba halide being chloride, bromide or iodide.

13. The method as claimed in claim 10, wherein said fluoride glass is an $InF_3$ glass.

14. The method as claimed in claim 10, wherein said core has a core radius which is not greater than 1.95 μm.

15. The optical fiber amplifier as claimed in claim 1, wherein said core glass contains LiF in a proportion of 3 to 12 mol % and within the range $(11-0.4x)<y<(15-0.4x)$ in which x represents the concentration of $PbF_2$ (mol %) and y represents the concentration of LiF (mol %).

16. The optical fiber amplifier as claimed in claim 15 wherein the core of said optical fiber contains a core matrix comprising a fluoride glass composed of 50 to 60 mol % of $ZrF_4$, 7 to 25 mol % of $PbF_2$, 6 to 19 mol % of $BaF_2$, 1.5 to 6 mol % of $LaF_3$, 0 to 4 mol % of at least one member selected from the group consisting of $ScF_3$, $YF_3$, $GdF_3$ and $LuF_3$, 1.5 to 5 mol % of $AlF_3$, and 3 to 12 mol % of LiF, with the total amount of the components being 100 mol %.

17. The optical fiber amplifier as claimed in claim 1 wherein the core of said optical fiber contains a core matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $GaF_3$, and 2 to 10 mol % of LiF or NaF, with the total amount of the components being 100 mol %.

18. The optical fiber amplifier as claimed in claim 1 wherein the core of said optical fiber contains a core matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %.

19. The optical fiber amplifier as claimed in claim 1, wherein said rare earth metal ions are one member selected from the group consisting of $Pr^{3+}$, $Pr^{3+}$—$Yb^{3+}$, $Pr^{3+}$—$Nd^{3+}$, and $Pr^{3+}$—$Er^{3+}$.

20. The optical fiber amplifier as claimed in claim 1, wherein said core has a core radius of 1.95 μm or less.

21. The optical fiber amplifier as claimed in claim 20, wherein said rare earth metal ions are ones selected from the group consisting of $Pr^{3+}$, $Pr^{3+}$—$Yb^{3+}$, $Pr^{3+}$—$Nd^{3+}$, and $Pr^{3+}$—$Er^{3+}$.

22. The method as claimed in claim 8, wherein the core glass further contains LiF in a proportion of 3 to 12 mol % and within the range $(11-0.4x)<y<(15-0.4x)$ in which x represents the concentration of $PbF_2$ (mol %) and y represents the concentration of LiF (mol %).

23. The method as claimed in claim 22, wherein said core contains a core matrix comprising a fluoride glass composed of 50 to 60 mol % of $ZrF_4$, 7 to 25 mol % of $PbF_2$, 6 to 19 mol % of $BaF_2$, 1.5 to 6 mol % of $LaF_3$, 0 to 4 mol % of at least one member selected from the group consisting of $ScF_3$, $YF_3$, $GdF_3$ and $LuF_3$, 1.5 to 5 mol % of $AlF_3$, and 3 to 12 mol % of LiF, with the total amount of the components being 100 mol %.

24. The method as claimed in claim 8, wherein said core contains a core matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $GaF_3$, and 2 to 10 mol % of LiF or NaF, with the total amount of the components being 100 mol %.

25. The method as claimed in claim 8, wherein said core contains a core matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %.

26. The method as claimed in claim 8, wherein said rare earth metal ions are one member selected from the group consisting of $Pr^{3+}$, $Pr^{3+}$—$Yb^{3+}$, $Pr^{3+}$—$Nd^{3+}$, and $Pr^{3+}$—$Er^{3+}$.

27. The method as claimed in claim 8, wherein said core has a core radius of 1.95 μm or less.

28. The method as claimed in claim 27, wherein said rare earth metal ions are ones selected from the group consisting of $Pr^{3+}$, $Pr^{3+}$—$Yb^{3+}$, $Pr^{3+}$—$Nd^{3+}$, and $Pr^{3+}$—$Er^{3+}$.

29. The optical fiber amplifier as claimed in claim 17, wherein said cladding contains a cladding matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $AlF_3$ or $GaF_3$, and 2 to 10 mol % of LiF or NaF, with the total amount of the components being 100 mol %.

30. The optical fiber amplifier as claimed in claim 17, wherein said cladding contains a cladding matrix comprising a fluoride glass composed of 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$ and 15 to 25 mol % of one member selected from the group consisting of LiF and NaF, with the total amount of the components being 100 mol %.

31. The optical fiber amplifier as claimed in claim 18, wherein said cladding contains a cladding matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $ScF_3$, $YF_3$, $GdF_3$ and $LuF_3$, 0 to 5 mol % of $AlF_3$, and 0 to 15 mol % of LiF or NaF, with the total amount of the components being 100 mol %.

32. The optical fiber amplifier as claimed in claim 18, wherein said cladding contains a cladding matrix comprising a fluoride glass composed of 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$ and 15 to 25 mol % of one member selected from the group consisting of LiF and NaF, with the total amount of the components being 100 mol %.

33. The optical fiber amplifier as claimed in claim 6, wherein said rare earth metal ions are selected from the group consisting of $Pr^{3+}$, $Pr^{3+}$—$Yb^3$, $Pr^{3+}$—$Nd^{3+}$, and $Pr^{3+}$—$Er^{3+}$.

34. The optical fiber amplifier as claimed in claim 6, wherein said halogen is chlorine, bromine or iodine.

35. The optical fiber amplifier as claimed in claim 7, wherein said fluoride glass is an $InF_3$ glass.

36. The optical fiber amplifier as claimed in claim 7, wherein said fluoride glass is a $ZrF_4$ glass.

37. The optical fiber amplifier as claimed in claim 36, wherein said $ZrF_4$ glass contains Ba halide.

38. The method as claimed in claim 24, wherein said cladding contains a cladding matrix comprising a fluoride glass composed of 10 to 40 mol % of $InF_3$, 20 to 50 mol % of $ZnF_2$, 6 to 30 mol % of $BaF_2$, 5 to 15 mol % of $SrF_2$, 0 to 25 mol % of $PbF_2$, 0 to 7 mol % of $CdF_2$, 1.5 to 6 mol % of at least one member selected from the group consisting of $LaF_3$, $ScF_3$, $YF_3$, $GdF_3$ and $LuF_3$, 1.5 to 5 mol % of $AlF_3$ or $GaF_3$, and 2 to 10 mol % of LiF or NaF, with the total amount of the components being 100 mol %.

39. The method as claimed in claim 24, wherein said cladding contains a cladding matrix comprising a fluoride glass composed of 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of one member selected from the group consisting of LiF and NaF, with the total amount of the components being 100 mol %.

40. The method as claimed in claim 25, wherein said cladding contains a cladding matrix comprising a fluoride glass composed of 10 to 40 mol % of $InF_3$, 20 to 50 mol % of $ZnF_2$, 5 to 25 mol % of $PbF_2$, 6 to 19 mol % of $BaF_2$, 5 to 15 mol % of $SrF_2$, 0 to 7 mol % of $CdF_2$, 0 to 10 mol % of $LaF_3$, 0 to 4 mol % of at least one member selected from the group consisting of $Sc_3$, $YF_3$, $GdF_3$ and $LuF_3$, 0 to 5 mol % of $AlF_3$, and 0 to 15 mol % of LiF or NaF, with the total amount of the components being 100 mol %.

41. The method as claimed in claim 25, wherein said cladding contains a cladding matrix comprising a fluoride glass composed of 43 to 55 mol % of at least one member selected from the group consisting of $ZrF_4$ and $HfF_4$, 18 to 28 mol % of $BaF_2$, 1.5 to 6 mol % of $LaF_3$, 0 to 4 mol % of one member selected from the group consisting of $ScF_3$, $YF_3$, $GdF_3$ and $LuF_3$, 1.5 to 5 mol % of $AlF_3$, and 15 to 25 mol % of one member selected from the group consisting of LiF and NaF, with the total amount of the components being 100 mol %.

42. The method as claimed in claim 13, wherein said rare earth metal ions are selected from the group consisting of $Pr^{3+}$, $Pr^{3+}$—$Yb^{3+}$, $Pr^{3+}$—$Nd^{3+}$, and $Pr^{3+}$—$Er^{3+}$.

43. The method as claimed in claim 13, wherein said halogen is chlorine, bromine or iodine.

44. The method as claimed in claim 14, wherein said fluoride glass is an $InF_3$ glass.

45. The method as claimed in claim 14, wherein said fluoride glass is a $ZrF_4$ glass.

46. The method as claimed in claim 45, wherein said $ZrF_4$ glass contains Ba halide.

* * * * *